United States Patent
Pugh et al.

(10) Patent No.: US 11,035,967 B2
(45) Date of Patent: Jun. 15, 2021

(54) BAYESIAN POLARITY DETERMINATION

(71) Applicants: SCHLUMBERGER TECHNOLOGY CORPORATION, Sugar Land, TX (US); CAMBRIDGE ENTERPRISE LIMITED, Cambridge (GB)

(72) Inventors: David J. Pugh, Cambridge (GB); Robert S. White, Gt Shelford (GB); Philip Andrew Felton Christie, Cambridge (GB)

(73) Assignees: SCHLUMBERGER TECHNOLOGY CORPORATION, Sugar Land, TX (US); CAMBRIDGE ENTERPRISE LIMITED

( * ) Notice: Subject to any disclaimer, the term of this patent is extended or adjusted under 35 U.S.C. 154(b) by 312 days.

(21) Appl. No.: 15/760,679

(22) PCT Filed: Sep. 15, 2016

(86) PCT No.: PCT/US2016/051804
§ 371 (c)(1),
(2) Date: Mar. 16, 2018

(87) PCT Pub. No.: WO2017/048884
PCT Pub. Date: Mar. 23, 2017

(65) Prior Publication Data
US 2019/0086566 A1    Mar. 21, 2019

Related U.S. Application Data

(60) Provisional application No. 62/219,181, filed on Sep. 16, 2015.

(51) Int. Cl.
*G01V 1/30* (2006.01)
*G01V 1/00* (2006.01)
*G01V 1/28* (2006.01)

(52) U.S. Cl.
CPC .............. *G01V 1/307* (2013.01); *G01V 1/008* (2013.01); *G01V 1/288* (2013.01); *G01V 1/30* (2013.01);
(Continued)

(58) Field of Classification Search
CPC ........ G01V 1/307; G01V 1/008; G01V 1/228; G01V 1/30; G01V 2210/1232;
(Continued)

(56) References Cited

U.S. PATENT DOCUMENTS 3,495,076 A * 2/1970 Fettweis ................. G06F 17/15
                                                                                                      708/445
5,101,195 A    3/1992 Caillat et al.
(Continued)

OTHER PUBLICATIONS

Aldersons, F., "Toward a Three-Dimensional Crustal Structure of the Dead Sea region from Local Earthquake tomography", Ph.D. thesis, 2004, Tel Aviv University, 130 pages.
(Continued)

*Primary Examiner* — Matthew G Marini

(57) ABSTRACT

A device for assigning to the unknown onset of a signal in a noisy time series a probability of that onset having a signed excursion away from the trace mean including one or more means arranged to: define a polarity at a given time sample by reference to the sign of the amplitude difference between the extrema immediately before and after the given time sample in the time series; define a positive and a negative polarity probability density function; take the respective products of the positive and negative polarity probability density functions with an onset probability density function defining the probability that the onset of the signal occurs at a given time sample; and marginalize the respective products of the positive and negative polarity probability density functions with the onset probability density function over
(Continued)

time to estimate final probabilities that the onset has a positive or a negative polarity.

14 Claims, 20 Drawing Sheets

(52) U.S. Cl.
CPC ............... *G01V 2210/1232* (2013.01); *G01V 2210/1234* (2013.01); *G01V 2210/63* (2013.01); *G01V 2210/646* (2013.01); *G01V 2210/65* (2013.01)

(58) Field of Classification Search
CPC ....... G01V 2210/1234; G01V 2210/63; G01V 2210/646; G01V 2210/65
See application file for complete search history.

(56) References Cited

U.S. PATENT DOCUMENTS

| | | | |
|---|---|---|---|
| 7,277,797 | B1 | 10/2007 | Kunitsyn et al. |
| 10,634,803 | B2 | 4/2020 | Pugh et al. |
| 2009/0010104 | A1 | 1/2009 | Leaney |
| 2013/0322209 | A1 | 12/2013 | Khadhraoui et al. |
| 2014/0126328 | A1 | 5/2014 | Hirabayashi et al. |
| 2015/0177400 | A1 | 6/2015 | Ozbek et al. |

OTHER PUBLICATIONS

Allen, R. V, "Automatic Earthquake Recognition and Timing from Single Traces", Bulletin of the Seismological Society of America, 1978, 68(5), pp. 1521-1532.
Allen, R. V. "Automatic Phase Pickers: Their Present Use and Future Prospects", Bulletin of the Seismological Society of America, 1982, 72(6), pp. S225-S242.
Baer, M. et al., "An Automatic Phase Picker for Local and Teleseismic Events", Bulleting of the Seismological Society of America, 1987, 77(4), pp. 1437-1445.
Bernth, H. et al., "A comparison of the dispersion relations for anisotropic elastodynamic finite-difference grids", Geophysics, 2011, 76(3), pp. WA43-WA50.
Beyreuther, M. et al., "ObsPy: A Python Toolbox for Seismology", Seismological Research Letters, 2010, 81(3), pp. 530-533.
Brillinger, D. R. et al., "A Probability Model for Regional Focal Mechanism Solutions" Bulletin of the Seismological Society of America, 1980, 70(1), pp. 149-170.
Byerly, P., "The Montana earthquake of Jun. 28, 1925, G.M.C.T.", Bulletin of the Seismological Society of America, 1926, 16(4), pp. 209-265.
Di Stefano, R. et al., "Automatic seismic phase picking and consistent observation error assessment: application to the Italian seismicity", Geophysics Journal International, 2006, 165(1), pp. 121-134.
Drew, J. et al., "Automated Microseismic Event Detection and Location by Continuous Spatial Mapping", SPE 95513, presented at the Society of Petroleum Engineers Annual Technical Conference and Exhibition Dallas, Texas, U.S.A., 2005, 7 pages.
Drew, J. et al., "Coalescence microseismic mapping", Geophysics Journal International, 2013, 195(3), pp. 1773-1785.
Hardebeck, J. L. et al., "A New Method for Determining First-Motion Focal Mechanisms" Bulletin of the Seismological Society of American, 2002, 92(6), pp. 2264-2276.
Hardebeck, J. L. et al., "Using S/P Amplitude Ratios to Constrain the Focal Mechanisms of Small Earthquakes", Bulletin of the Seismological Society of America, 2003, 93(6), pp. 2434-2444.
Hibert, C. et al., "Automated identification, location, and volume estimation of rockfalls at Piton de la Fournaise volcano", Journal of Geophysical Research: Earth Surface, 2014, pp. I082-1105.
Knopoff, L. et al., "The compensated linear-vector dipole: A possible mechanism for deep earthquakes", Journal of Geophysical Research, 1970, 75(26), pp. 4957-4963.
Lee, W. H. K. et al., "HYPO71 (Revised): A computer program for determining hypocenter, magnitude, and first motion pattern of local earthquakes", Open-File Report 75-311, US Geological Survey, Jun. 2975, pp. 1-113.
Nakamula, S. et al., "Automatic seismic wave arrival detection and picking with stationary analysis: Application of the KM2O-Langevin equations", Earth, Planets, Space, 2007, 59(6), pp. 567-577.
Nakamura, M., "Automatic determination of focal mechanism solutions using initial motion polarities of P and S waves", Physics of the Earth and Planetary Interiors, 2004, 146(3-4), pp. 531-549.
Nakano, H., "Notes on the Nature of the Forces which give rise to the Earthquake Motions", Seis-tool. Bull. Cent. Met. Obs. Japan, 1923, 1, pp. 92-120.
Reasenberg, P. A. et al., "FPFIT, FPPLOT and FPPAGE: Fortran computer programs for calculating and displaying earthquake fault-plane solutions" OFR 85-739, Technical Report, USGS, 1985, 109 pages.
Ross, Z. E. et al., "Automatic picking of direct P, S seismic phases and fault zone head waves", Geophysical Journal International, 2014, 199(1), pp. 368-381.
Takanami, T. et al., "A new efficient procedure for the estimation of onset times of seismic waves", Journal of Physics of the Earth, 1988, 36, pp. 267-290.
Takanami, T. et al., "Estimation of the arrival times of seismic waves by multivariate time series model", Annals of the Institute of Statistical Mathematics, 1991, 43(3), pp. 403-433.
Trnkoczy, A., "Understanding and parameter setting of STA/LTA trigger algorithm", in New Manual of Seismological Observatory Practice 2 (NMSOP-2), 1999 (amended 2011), ed. Bormann, P. Deutsches GeoForschungsZentrum GFZ, pp. 1-20.
Walsh, D., et al., "A Bayesian approach to determining and parametrizing earthquake focal mechanisms", Geophysical Journal International, 2009, 176(1), pp. 235-255.
White, R. S., et al., "Dynamics of dyke intrusion in the mid-crust of Iceland", Earth and Planetary Science Letters, 2011, 304(3-4), pp. 300-312.
Withers, M., et al, "A Comparison of Select Trigger Algorithms for Automated Global Seismic Phase and Event Detection", Bulletin of the Seismological Society of America, 1998, 88(1), pp. 95-106.
Zahradnik, J., et al., "Analysis of the source scanning algorithm with a new P-wave picker", Journal of Seismology, 2014, 19(2), pp. 423-441.
Riedesel, M. A. et al., "Display and Assessment of Seismic Moment Tensors", Bulletin of the Seismological Society of America, 1989, 79(1), pp. 85-100.
Tape, W. et al., "A geometric setting for moment tensors", Geophysical Journal International, 2012, 190(1), pp. 476-498.
Shimizu, H. et al., "A tensile-shear crack model for the mechanism of volcanic earthquakes", Tectonophysics, 1987, 144(1-3), pp. 287-300.
Snoke, J. A., "FOCMEC: FOCal MEChanism determinations", Technical Report, 2009, 22 pages.
International Preliminary Report on Patentability of International Patent Application No. PCT/US2016/051804, dated Mar. 29, 2018, 8 pages.
Sivia, D.S. et al., "Data Analysis: A Bayesian Tutorial", 2nd ed., Oxford University Press, New York, United States, pp. 4-13.
Communication and Extended European Search Report of EP Patent Application No. 16847259.5, dated Jul. 22, 2019, 7 pages.
Zhebel, O. et al., "Simultaneous microseismic event localization and source mechanism determination", Geophysics, 2015, 80(1), pp. KS1-KS9.

\* cited by examiner

Gaussian Arrival-Time PDF  STA/LTA Arrival-Time PDF

(a)

(b)   Blue   
Red

BAYESIAN POLARITY DETERMINATION

CROSS-REFERENCE TO RELATED APPLICATIONS

This application claims priority to and the benefit of U.S. Provisional Application No. 62/219,181, filed Sep. 16, 2015, the entire disclosure of which is hereby incorporated herein by reference.

The present disclosure relates to a Bayesian approach to polarity determination, and is applicable to determination of characteristics of fractures and/or faults from microseismic data.

BACKGROUND

First-motion-based source inversion of earthquakes can be used to constrain nodal planes and to help estimate the source parameters. The use of first-motion polarities was proposed by Nakano (1923) and first implemented by Byerly (1926). These first-motion polarities of the phase arrivals provide an important constraint on the focal mechanism.

There are several source inversion approaches that utilize first motion polarities to determine the source type, such as FPFIT (Reasenberg & Oppenheimer 1985), which uses P-polarities to determine the double-couple source, HASH (Hardebeck & Shearer 2002, 2003), which can also incorporate amplitude ratios in determining the double-couple source, and FOCMEC (Snoke 2003), which uses P, SH and SV polarities and amplitude ratios to search for double-couple sources. These inversion approaches are often limited (as in these three cases) to a double-couple source model.

Manual polarity picking is time consuming, especially for large microseismic data sets with large numbers of receivers and low signal-to-noise ratios (SNRs). Modern workflows often process the data automatically, so the addition of a slow manual step into the automated workflow is undesirable.

The first motion of a seismic signal can often be hard to discern from background noise and filter artefacts, especially for low-magnitude events. Consequently, a robust first-motion source inversion requires some understanding of the likelihood of an incorrect polarity measurement. While the human eye and judgement are often correct when manually picking the polarity of an arrival on a seismic trace, it is usually recorded simply as being either positive or negative, although additional information in the pick such as whether it is impulsive or emergent, as well as the pick weight, can be used as indicators of the polarity pick quality. Determination of the first motion using a binary classification does not allow the assignment of any quantitative value to reflect the level of measurement uncertainty. Many automatic approaches which can be used to determine polarities usually produce results with a binary classification (Baer & Kradolfer 1987; Aldersons 2004; Nakamura 2004).

One common approach to deal with errors in the polarity picks is to allow a certain number of mistaken polarities in a fault plane solution (Reasenberg & Oppenheimer 1985); another is to provide a probability of a mistaken pick (Hardebeck & Shearer 2002, 2003). Nevertheless, these approaches do not account for how likely it is that an interpreter picks an arrival incorrectly, because this depends on both the noise on the particular trace and the arrival characteristics, such as whether the arrival onset is impulsive or emergent. Consequently, the probability of an incorrect pick differs for each arrival.

SUMMARY

The approach of the present invention eschews this binary classification for the polarity observations. Instead the probability of an arrival being a positive or negative polarity is calculated from a noisy time series (e.g. a seismogram or other waveform). This allows the inclusion of uncertainty in the arrival in a quantitative assessment of the polarity, and can be incorporated in an earthquake source inversion approach, e.g. of Pugh et al. (2016).

In a first aspect, the present invention provides a method for assigning to the unknown onset of a signal in a noisy time series a probability of that onset having a signed excursion away from the trace mean by:
  defining a polarity at a given time sample by reference to the sign of the amplitude difference between the extrema immediately before and immediately after the given time sample in the time series;
  defining a positive polarity probability density function by combining the polarity at a given time sample with a statistical weight based on the amplitude difference between the extrema immediately before and immediately after the given time sample, marginalized over the estimated noise in the time series;
  defining a negative polarity probability density function consistent with the positive polarity probability density function and a requirement that the instantaneous positive and negative probability values sum to unity;
  taking the respective products of the positive and negative polarity probability density functions with an onset probability density function defining the probability that the onset of the signal occurs at a given time sample; and
  marginalizing the respective products of the positive and negative polarity probability density functions with the onset probability density function over time to estimate final probabilities that the onset has a positive or a negative polarity.

In a second aspect, the present invention provides a procedure for determining a focal point source type of an earthquake, the procedure including:
  performing the method of the first aspect with the, or each, noisy time series being a seismogram; and
  using the estimated final probabilities as a constraint to perform source inversion on the seismogram(s).

In a third aspect, the present invention provides a procedure for performing a hydraulic fracturing operation in a well including:
  injecting fluid into the well to create cracks in downhole rock formations;
  simultaneously obtaining microseismic data from the formations (e.g. using one or more hydrophones, geophones, accelerometers, and/or distributed acoustic sensing), the microseismic data including one or more seismograms;
  performing the method of the first aspect on the or each seismogram; and
  using the estimated final probabilities to reveal the focal point source types of cracks created in response to the injection of the fluid.

A further aspect of the present invention provides a device to perform the method of the first or second aspect. For example, a device may be provided for assigning to the unknown onset of a signal in a noisy time series a probability of that onset having a signed excursion away from the trace mean, the system including one or more means arranged to: (i) define a polarity at a given time sample by reference to the sign of the amplitude difference between the extrema immediately before and immediately after the given time sample in the time series; (ii) define a positive polarity probability density function by combining the polarity at a given time sample with a statistical weight based on the amplitude difference between the extrema immediately before and immediately after the given time sample, marginalized over the estimated noise in the time series; (iii) define a negative polarity probability density function consistent with the positive polarity probability density function and a requirement that the instantaneous positive and negative probability values sum to unity; (iv) take the respective products of the positive and negative polarity probability density functions with an onset probability density function defining the probability that the onset of the signal occurs at a given time sample; and (v) marginalize the respective products of the positive and negative polarity probability density functions with the onset probability density function over time to estimate final probabilities that the onset has a positive or a negative polarity.

Such a device may be a suitably programmed computer system, the one or more means being one or more processors of the system. The computer system may further include a storage medium storing the time series. Indeed, further aspects of the present invention provide a computer program comprising code which, when run on a computer, causes the computer to perform the method of the first or second aspect; a computer readable medium storing a computer program comprising code which, when run on a computer, causes the computer to perform the method of the first or second aspect However, the device may be a dedicated electronic hardware device. Advantageously, a dedicated electronic hardware device may be able to arrive at the estimated final probabilities more quickly than a programmed computer system. Thus, for example, to perform the defining of a polarity at a given time sample, the electronic hardware device may have an analog-to-digital converter (e.g. with the gain set high), or just diodes feeding electric switches. To perform the defining of a positive polarity probability density function, the hardware device may have an integrator (i.e. an electronic integration circuit) that uses a variable voltage operational amplifier, where e.g. the variation in the voltage has the value of the statistical weight. The hardware device may then further have a peak-detector-circuit that detects the extrema, the voltage difference between the extrema being used as the voltage on the integrator. To perform the defining of a negative polarity probability density similar component(s) can be used e.g. an integrator and a peak-detector-circuit. To perform the taking of the respective products, the hardware device may have an analog multiplier circuit. The hardware device may then further have a suitable detector, such as an earthquake detector of the type described in U.S. Pat. No. 5,101,195, to provide the onset probability density function. Finally, to perform the marginalizing of the respective products, the hardware device may have another integrator.

Optional features of the invention will now be set out. These are applicable singly or in any combination with any aspect of the invention.

The onset probability density function may be calculated in real-time or near-real-time.

The onset probability density function may be automatically generated, e.g. by an automated arrival picker, such as CMM (Drew et al. 2013).

The probability density function, $P(+|\sigma_{meas})$, for a positive polarity (+), given a polarity function pol(t) that defines the polarity at time t, an amplitude change ($\Delta(t)$) between successive extrema, and an estimated noise standard deviation $\sigma_{meas}$ may be a cumulative distribution of the product of polarities and amplitude changes, such as:

$$P(+|\sigma_{mes}) = \frac{1}{2}\left(1 + \text{erf}\left(\frac{pol(t) \cdot \Delta(t)}{2\sigma_{mes}}\right)\right)$$

The method may be performed repeatedly for each of plural noisy time series.

The, or each, noisy time series may be a seismogram. For example, the, or each, seismogram may be a waveform of a pressure wave, a shear wave, a horizontally polarized shear wave or a vertically polarized shear wave. When there are plural seismograms, each may be from a respective measurement station. The method may include a preliminary step of performing seismic testing, e.g. using one or more hydrophones, geophones, accelerometers, and/or distributed acoustic sensing, to obtain the seismogram(s).

BRIEF DESCRIPTION OF THE DRAWINGS

Embodiments of the invention will now be described by way of example with reference to the accompanying drawings in which:

FIG. 18 shows the positions of the different source types on the lune plot.

FIG. 18 shows the positions of the different source types on the lune plot.

FIG. 18 shows the positions of the different source types on the lune plot.

FIG. 18 shows the positions of the different source types on the lune plot.

DETAILED DESCRIPTION AND FURTHER OPTIONAL FEATURES

1 Overview

Figure 1:
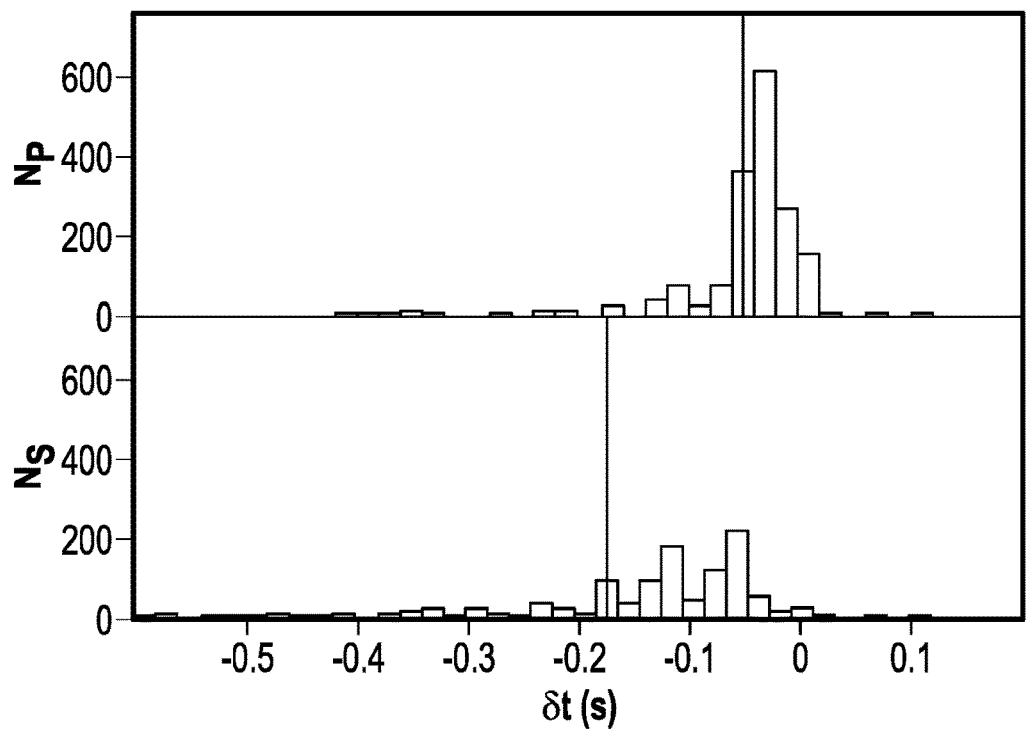
FIG. 1. Histogram of 1791 arrival time pick differences between automatic and manually refined picks. The vertical black lines show the mean shift for each pick type. The top histogram is for P arrivals, and the bottom shows S arrivals. Typical frequency of the arrival is ~10 Hz. Automatic picks were made using the coalescence microseismic mapping method (Drew et al. 2013) on microseismic data from the Askja region of Iceland. The automatic picks were made using an STA window of 0.2 s and an LTA window of 1.0 s.

Embodiments of the present disclosure provide probabilistic automatic first motion polarity determinations for use in any sampled noisy data series of constant mean in which it is desired to ascribe to the onset of a signal in the series the probability of an upward (positive-going) or downward (negative-going) excursion from the data series mean. Embodiments of the present disclosure provide for characterizing the rupture source mechanism of an earthquake, such as may occur naturally or may be generated by anthropogenic processes such as hydrofracture, fluid injection into, or fluid abstraction from sub-surface formations. However, this application is provided by way of example and is not intended to limit the scope of application of this invention.

In a hydraulic fracture operation, high pressure fluids are injected into a low permeability rock through perforation holes in a cased borehole. The purpose of the injection is to open a fracture through the rock to create a high permeability path for the later flow of formation fluids, usually hydrocarbons, into the producing well. To keep the newly created fracture open, the injection fluids transport into the fracture a proppant, often rounded sand grains of a uniform size, that prevents the fracture from closing once the injections pressure is released. During emplacement of the fracture, brittle rocks fail and release elastic energy in the form of propagating compressional (P) and shear (S) seismic waves. Each brittle rock failure is a small earthquake and is often called a microseismic event.

With appropriate sets of seismic detectors and recording equipment, and understanding of the seismic wave propagation properties of the medium between the microseismic event and the detectors, the energy released by each microseismic event may be localized in space and time to identify where and when the event took place. Mapping the spatio-temporal evolution of the microseismic events allows the direction, height and extent of the hydraulic fracture to be evaluated.

The seismic energy recorded by the detectors may also be back-propagated to a notional unit sphere, called the focal sphere, around the microseismic event. At the focal sphere, the distribution of the P and S energy—of which the direction of first ground motion relative to the detector, or polarity is an important attribute in evaluating fault plane geometry—is indicative of the type and geometry of rock rupture, and the amplitudes of the distribution are indicative of the rupture dynamics (size of rupture, rupture velocity, stress drop). The amplitude distribution may be fully characterized by the six elements of the moment tensor, computable from the seismic observations and Green functions modelled for the medium between event location and the detectors.

Because underground stresses are high, most natural earthquakes occur by shear failure as slip along a fault plane. Such a rupture is called double-couple because the shear stress distribution in the rock just before failure has the form of two balanced force couples, separated by two orthogonal planes. At rupture, failure takes place along one of the two planes which must be identified using other information. In a hydraulic fracture, pressure along the rupture plane is high and exceeds the fracture toughness of the rock. The rock fails by opening against the minimum horizontal earth stress and the fracture propagates parallel to the maximum horizontal stress, often in the form of multiple, discrete microseismic failure events, each of which may have elements of both double-couple and volumetric opening modes, possibly followed by closing modes as hydraulic pressure is released. It is desired to have a quantitative estimate of the moment tensor components, together with an estimate of their uncertainties, in order to characterize each microseismic rupture.

Embodiments of the present disclosure provide for obtaining a quantitative estimate of the probability that the initially unknown arrival has an onset of positive or negative polarity of ground motion. In embodiments of the present disclosure, such estimating of this polarity probability may be automated. Embodiments of the present disclosure that are automated may provide for dealing quantitatively with uncertainty due to noise in the data and the unknown arrival time, is repeatable, and is independent of human judgement in picking the arrival. In the seismic case, these probability estimates may be used, in Bayesian or probabilistic methods of inverting seismic data for rupture mechanisms and geometries, to identify the source type and understand, in near-real time, the mechanisms for fracture propagation, including those which are most beneficial for fluid flow.

Because earthquake rupture sources have P- and S-wave radiation patterns that are characteristic of the source mechanism and fault geometry, first-motion polarity-based inversion of earthquake seismograms can be used to constrain focal plane geometry and to help determine the source parameters. Polarity observations are the most basic observations that can be used for source inversion, and provide constraints on regions of contrasting and identical polarities on the focal sphere, which, together with the symmetries in the moment tensor, help to constrain the possible source types and orientations. This approach was proposed by Nakano (1923) and first implemented by Byerly (1926). The polarity of the phase (term used in earthquake seismology for P-wave, S-wave, surface wave, etc.) arrivals is an important constraint on the focal mechanism. First-motion based source inversion approaches are usually forward-model based, because the problem is non-linear with respect to the source. Most approaches work by evaluating the theoretical polarity distribution on the focal sphere and comparing it to the observed data.

A seismogram is a specific example of a time series, in which the sensor motion caused by a natural earthquake, induced earthquake, or active source, is captured as a relatively compact signal in the time series with initially unknown arrival time and polarity, both of which need to be estimated from the detected signal. The first motion of any arrival in a time series, especially for low-amplitude arrivals, can often be hard to discern from background noise and possible filter artefacts. Consequently, any robust use of these observations, such as inversion of first-motion (micro-)earthquake arrival time and polarity data for source characteristics, requires some understanding of the likelihood of an incorrect measurement. Ascribing a quantified uncertainty estimate to the polarity of a signal (more generally, a feature) onset, whose arrival time and wave-shape are not known a-priori, is a requirement in many applications of time-series analysis. The challenge of detecting a transient signal in a noisy time series, estimating its time of onset or first motion, and ascribing a probability to the polarity (direction of first motion) may be distinguished from the challenge of change point detection in which just the time at which a change in the probability distribution of samples in a time series is required. Hereafter, we focus on the application to (micro)-earthquake events but the described method has more general applicability for other data. It is also useful that the method does not require the time series to have zero mean (although seismic data usually are time series with zero mean).

While the human eye and judgement are often correct in manually picking the polarity of an arrival on a time series, it is usually recorded simply as being either positive or negative. Determination of the first motion using a binary classification does not allow any quantitative value to be assigned to reflect the level of uncertainty of the measurement, and many automatic approaches for determining polarities usually produce results, as with the eye, with a binary classification.

In the microseismic case, the signal to noise ratio of the microseismic data can often be low, and this may lead to uncertainty as to whether the polarity of the picked first arrival is correct. Embodiments of the present disclosure provide an automated probabilistic approach to polarity picking that may, in some embodiments, be combined with manual picking. This approach produces a better estimate of the uncertainty of the polarity, improving the polarity probability in source inversion, and is also sufficiently fast to be incorporated into an automated processing work-flow.

When used in source inversion, the results of embodiments of the present disclosure are consistent with those from manual observations. In some cases, embodiments of the present disclosure produce a clearer constraint on the range of high probability solutions, and the results are better constrained than solutions determined using a uniform probability of an incorrect polarity pick. This is a common approach to deal with errors in the polarity picks, by including this probability of an incorrect observation in the source inversion, which is a blanket probability across all receives in the network and does not reflect the individual differences between receivers. Furthermore embodiments of the present disclosure are more rigorous than allowing a certain number of mistaken polarities in a fault plane solution because a probability is estimated for each polarity pick, based on its individual characteristics, instead of assuming that, say, 15% of the pick population will be erroneous without identifying which picks may be erroneous.

A basic approach used for determination of polarities can be broken down into two steps:
1. Look for the next stationary value after time t in the time series.
2. Determine the polarity at time t from the type of the next stationary value (maximum/minimum) after time t.

Using this technique, it is possible to ascribe a polarity to each and every sample in a given time series. Applying this estimation to the whole waveform retains the polarity information, while discarding both amplitude and phase. This reduces the problem of determining the signal onset polarity to selecting which time sample (t) ('time pick') is representative of the correct signal onset, and accounting for the effects of the background noise, as this can affect the observation. The approach described in this disclosure provides a quantitative method of incorporating both the uncertainties in the arrival time pick and the background noise into the polarity estimate.

Pick times, whether estimated automatically or manually, are often imprecise with respect to the true first motion of the arrival: noise and the choice of picking approach often lead to a late detection in automated picks, while personal preferences may lead to inconsistencies in manual picks, as some people pick the arrival at the first peak, others at the initial perceived onset. For an uncertain time pick, the identification of positive or negative polarity with 100% confidence may not be meaningful, as it does not refer to the true first arrival. Therefore, the most useful quantification of the polarity, especially for a later Bayesian or probabilistic workflow for e.g. source inversion, is the probability of the first motion being positive or negative.

The amplitude change of the candidate first arrival can provide an indication of how likely it is to have been affected by noise, so the amplitude change could be used to give the arrival some quality weighting. However, it is more rigorous to more estimate the likelihood of the value being positive or negative, based on the measured noise level, i.e. by determining the probability that the amplitude change of the candidate first arrival, for time t, is not due to the noise (see FIG. 3b discussed below). Consequently, the polarity probability density function (FIG. 3d) is given by the product of the probability that the amplitude change for the candidate first arrival, is not due to the noise (FIG. 3b), multiplied by the probability that the candidate time sample corresponds to the signal arrival onset (FIG. 3c), marginalized over the signal onset time PDF. The resultant probabilities of positive and negative polarity can be assigned to each arrival (see e.g. FIG. 12), which can then be used for probabilistic inversion of the arrival data for earthquake source parameters (see e.g. FIG. 19), with associated uncertainties, and provides a rigorous approach for incorporating the uncertainties in the polarity of the arrival.

An example probability distribution function for a candidate signal to have a positive (upward excursion) polarity at the onset time is given by (FIG. 3b, red positive trace):

$$P(+ \mid \sigma_{mes}) = \frac{1}{2}\left(1 + \mathrm{erf}\left(\frac{pol(t) \cdot \Delta(t)}{2\sigma_{mes}}\right)\right)$$

where: $\Delta(t)$ is the absolute amplitude change at time t, with polarity $pol(t)$ and $\sigma_{mes}$ is the measured background noise level on the waveform. This PDF has been marginalized with respect to the measurement noise, retaining a dependence on the noise standard deviation ($\sigma_{mes}$). However, it is also necessary to marginalize for the pick time error, to account for the uncertainty in the pick time.

Figure 3:
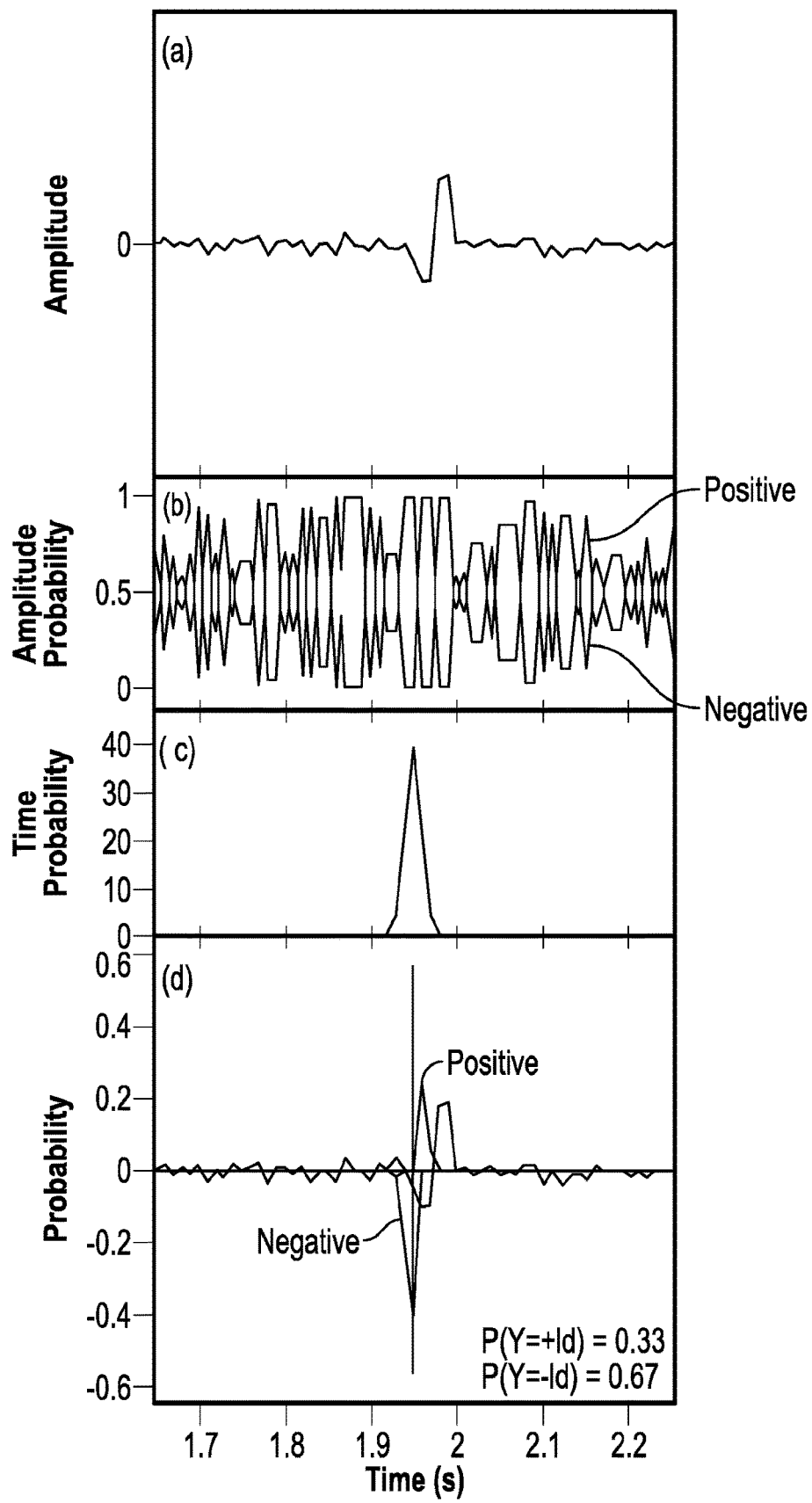
FIG. 3. Plot of trace and the associated PDFs for the different stages of the probabilistic polarity determination. (a) shows the waveform, (b) shows the amplitude PDFs for positive (red) and negative (blue) polarities having accounted for noise, (c) shows the time probability function, and (d) shows the combined PDFs for positive (red) and negative (blue) polarities superimposed on the waveform (grey). The vertical lines correspond to the arrival-time pick.

A possible, although perhaps arbitrary, probability distribution for onset time pick accuracy is a Gaussian distribution around the pick. However, the onset time PDF should peak around the first half-cycle of the arrival, rather than the whole signal (FIG. 3). If the PDF peak is too late or too wide, this reduces the resultant probability and can lead to incorrect results.

The onset time PDF can be generated using any form of manual or automated arrival picker, such as CMM (Drew et al. 2013). Baer and Kradolfer (1987) introduced the concept of 'phase detectors' and 'phase pickers'. Phase detectors are relatively imprecise, and will be improved by human re-picking, as is the case with the CMM approach. However, phase pickers should produce results that are comparable to those picked manually. Consequently it may be better to use a phase picker to determine more accurately the onset and construct the arrival time PDF.

There are many approaches to accurate onset time pickers such as the methods discussed in Baer and Kradolfer (1987), STA/LTA pickers (e.g. Allen, 1978; Allen, 1982; Trnkoczy, 2012), auto-regressive pickers (e.g. Takanami and Kitagawa, 1988; Takanami and Kitagawa, 1991; Nakamura, 2004), using stationary analysis (Nakamula et al., 2007) and kurtosis-based pickers (e.g. Ross and Ben-Zion, 2014; Hibert et al., 2014), right to left pick averaging (Zahradnik et al., 2014), as well as many others. Withers et al. (1998) provide an overview of several of these different approaches, as do Di Stefano et al. (2006). Any of these methods can be used to construct a different arrival time PDF, such as a Gaussian, using the size and onset of the peak in the characteristic function ($F_C$) as an indicator of the uncertainty, e.g., $$\sigma_\tau = \frac{\tau_{max} - \tau_{min}}{F_C(t = \tau_{max}) - F_C(t = \tau_{min})}$$

where: $\tau_{max}$ is the time of the maximum in the peak, and $\tau_{min}$ is the time of the minimum.

The resulting polarity probabilities usually agree well with solutions from manual picking (see e.g. FIG. 12), with the more uncertain solutions corresponding to low quality onset time picks and high noise levels. The arrivals with high quality time picks (more saturated colours) show good agreement between the manual polarity picks (solid bars) and the dominant polarity probability.

Manual polarity picks can be used as prior information for the polarity probabilities, while still including the uncertainty determination from this approach. This approach can also be used as a method of determining the arrival polarities of other seismic phases which require hypocenter information and consequently cannot be determined when carrying out any manual pick refinement.

Figure 19:
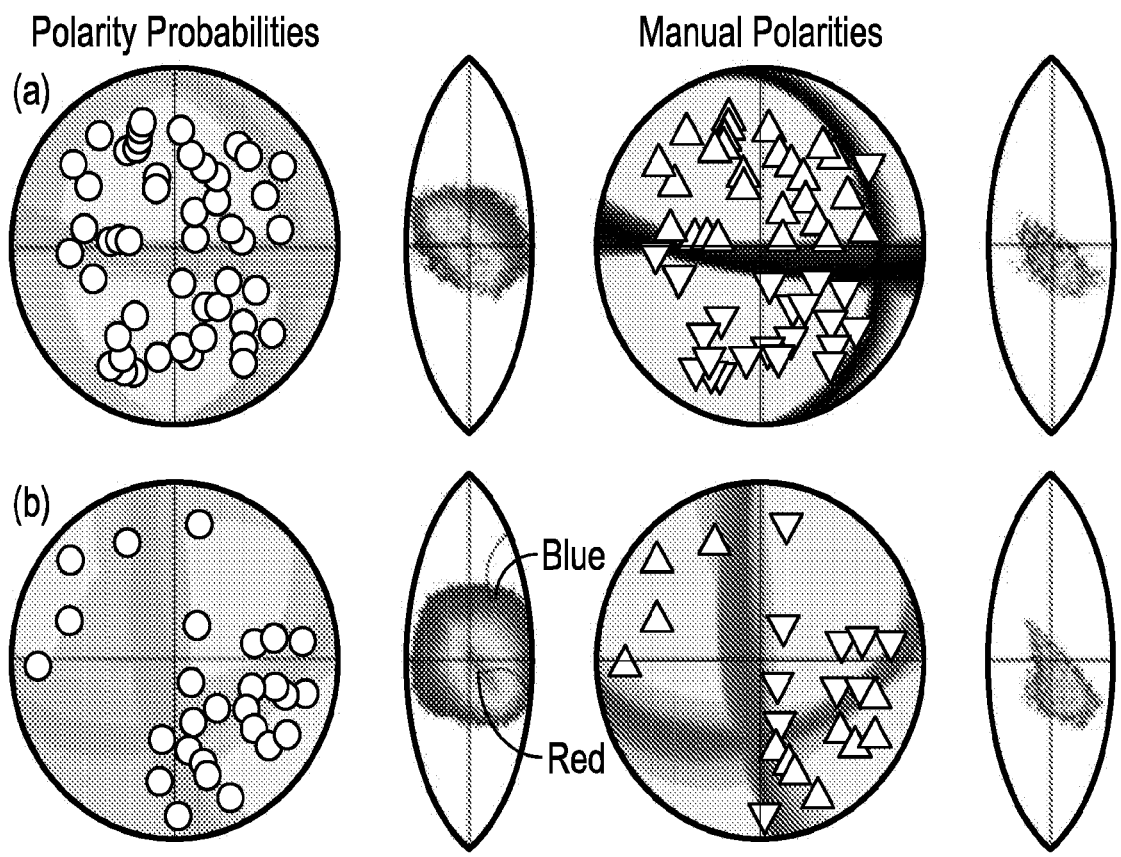
FIG. 19. Comparison between automated polarity and manual polarity source inversions for two events, one synthetic (a) and the event from Table 1 and FIG. 12(b). The first and second columns are the double-couple source PDFs for the automated polarity probabilities and manual polarity observations, respectively. The third and fourth columns are the full moment tensor PDFs for the automated polarity probabilities and manual polarity observations, respectively. The fault plane plots show the most likely solutions with the darkest lines. The stations are indicated by circles for the automated polarity probabilities, as no manual polarity information is used, and upwards red triangles or downwards blue triangles depending on the manually observed polarity. The lune plots are normalized and marginalized to show the most likely source type; red regions correspond to high probability and blue to low probability.

The Bayesian approach for source inversion discussed in Pugh et al. (2016) can easily be extended to include these probabilistic automated polarity observations, producing results that are comparable with those from manual polarity observations (see e.g. FIG. 19). FIG. 19 illustrates that the manual polarity picks will almost always result in a more tightly defined distribution (less scatter in column 4 than in column 3) as the solutions correspond to over-estimated polarity probabilities of approximately 1 for the positive or negative polarity directions, because the included uncertainty is small. However, the polarity probabilities (column 3) produce results consistent with all observations, with a more accurate estimate of the solution uncertainty by incorporating rigorous, objective and repeatable estimates of uncertainty on the measurements.

This quantitative method for including the noise in the polarity determination is more rigorous, unlike the approaches for manual polarity observations such as those described in Pugh et al. (2016), Walsh et al. (2009) and Brillinger et al. (1980).

Embodiments of the present disclosure provide for:

Automated calculation of the first motion polarity probabilities marginalized over noise and onset time uncertainties.

Use of the first motion polarity probabilities to characterize the polarities for phases such as horizontally polarized shear (SH) and vertically polarized shear (SV), which require rotation of the three component seismogram into the correct orientation using knowledge of the ray path and source location to assign a polarity at the focal sphere.

Use of the first motion polarity probabilities in source inversion and to provide a more rigorous approach for including the uncertainties on the polarity observation compared with previous approaches for manually determined polarities.

Use of the method with respect to general time series in which the polarity uncertainty at the onset of a feature needs to be estimated. The time series does not require zero mean.

Embodiments of the present disclosure provide for processing noisy data to determine properties of the data at its source. The properties of the data at its source may comprise first motion polarity. Understanding the first motion polarity provides for deriving an understanding of an event producing the noisy data from the noisy data. For example, in microseismic data the first motion polarity of energy produced by a microseismic event may be processed to provide an understanding of the rock structure and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

2 Bayesian Polarity Probability Determination

It is possible to determine the polarity of any given waveform at any point; doing this to the whole waveform retains the polarity information, while discarding both amplitude and phase information. Consequently, determining the arrival polarity is reduced to selecting which time, t, is representative of the correct arrival pick.

A basic approach used for manual determination of polarities can be broken down into two steps:

1. Look for the next amplitude maximum or minimum after the arrival-onset time tin the waveform.
2. Determine the polarity from the type of stationary value, with positive polarity corresponding to an amplitude maximum and negative to a minimum).

Such an approach is straightforward computationally. The polarity can be described at a given time t by a function, pol(t), which takes values switching between 1 and 1, for the next maximum or minimum.

Arrival-time picks are often imprecise with respect to the first motion of the arrival because of noise effects. Furthermore, when using automated pickers, the choice of picking approach often leads to a later triggering compared to manually refined picks (FIG. 1). However, manually refined picks can be affected by personal preferences, leading to different manual arrival-time picks on the arrival phase by different people. For an uncertain arrival-time pick, the identification of positive or negative polarity may not be meaningful, as it may not refer to the true first arrival. Therefore, this issue can be overcome by estimating the probability of the first motion being positive or negative.

The amplitude change of the peak of the candidate first arrival can provide an indication of the likelihood that it has been affected by noise. Therefore, the amplitude change could be used to give the arrival some quality weighting. However, it may be more precise to consider how likely the polarity is to be positive based on the measured noise level, that is, by determining the probability that the amplitude change of the candidate first arrival is not due to the noise.

2.1 Polarity Probability Function

The probability density function (PDF) of a given signed amplitude A having polarity Y=y, where y=±1, at an instrument is given by a step function such as the Heaviside step function $H(x)=\int_{-\infty}^{x}\delta(s)ds$, defined in terms of the delta function $\delta(x)$. This PDF is dependent on the amplitude measurement error, $\epsilon$, which arises both from the background noise and the measurement error in the device. The measured amplitude is given by the sum of the true amplitude and the measurement error, so, the PDF for observing a given amplitude value is dependent on both the true amplitude and the measurement error, and is:

$$p(Y=y|A,\epsilon)=H(y(A+\epsilon)). \tag{1}$$

Marginalization (e.g. Sivia 2000) includes the measurement error in the probability. It is assumed that only the mean and the variance of the noise are measurable and, therefore, the most ambiguous distribution (maximum entropy) is the Gaussian distribution, as can be shown using variational calculus (Pugh et al. 2016). This choice of distribution is valid independent of the actual random noise distribution. However, any correlated non-random noise should be accounted for. If more statistics of the noise are known, such as the higher order moments, the appropriate maximum entropy distribution should be used.

For data that have been de-meaned (DC-offset corrected) over a suitable window, the noise can be assumed to have zero mean, and a standard deviation $\sigma_{mes}$ independent of the amplitude, so that the probability that the c is the current amplitude error is Gaussian:

$$p(\epsilon|\sigma_{mes})=\frac{1}{\sqrt{2\pi\sigma_{mes}^2}}e^{-\frac{\epsilon^2}{2\sigma_{mes}^2}}. \tag{2}$$

Marginalizing over $\epsilon$ gives:

$$p(Y=y|A,\sigma_{mes})=\int_{-\infty}^{\infty}p(Y=y|A,\epsilon)p(\epsilon|\sigma_{mes})d\epsilon, \tag{3}$$

$$p(Y=y|A,\sigma_{mes})=\int_{-\infty}^{\infty}H(y(A+\epsilon))\frac{1}{\sqrt{2\pi\sigma_{mes}^2}}e^{-\frac{\epsilon^2}{2\sigma_{mes}^2}}d\epsilon. \tag{4}$$

The product $y\epsilon$ in eq. (1) changes the sign of the noise to reflect the polarity, but because the PDF for $\epsilon$ is symmetric, this change in sign has no effect. The integral can be simplified using a behaviour of the step function:

$$\int_{-\infty}^{\infty}H(x+\epsilon)f(\epsilon)d\epsilon=\int_{-x}^{\infty}f(\epsilon)d\epsilon, \tag{5}$$

which gives:

$$p(Y=y|A,\sigma_{mes})=\int_{-yA}^{\infty}\frac{1}{\sqrt{2\pi\sigma_{mes}^2}}e^{-\frac{\epsilon^2}{2\sigma_{mes}^2}}d\epsilon. \tag{6}$$

This can be rewritten, using the symmetry of the normal distribution about the mean, as:

$$p(Y=y|A,\sigma_{mes})=\int_{-\infty}^{yA}\frac{1}{\sqrt{2\pi\sigma_{mes}^2}}e^{-\frac{\epsilon^2}{2\sigma_{mes}^2}}d\epsilon \tag{7}$$

$$=\frac{1}{2}\left(1+\text{erf}\left(\frac{yA}{\sqrt{2}\,\sigma_{mes}}\right)\right).$$

It is important to note that the behaviour of this PDF produces a higher probability for stations with larger amplitudes, as these stations are more likely to have arrival polarities that are not perturbed by noise. However, if the noise standard deviation ($\sigma_{mes}$) is low, the PDF approaches the step function, reducing this effect.

Since polarity observations are either positive or negative, because the nodal region of a moment tensor source is infinitesimally thin, the probability for both cases should sum to unity.

2.2 Arrival Polarity Probability

Section 2.1 has given the PDF for observing a polarity given some amplitude and noise level. However, there is an additional time dependence when estimating the polarity of an arrival. For an arrival, the PDF for a positive polarity, Y=+1, depends on the amplitude at a given time. The amplitude can be written in terms of the polarity function, pol(t), and the absolute amplitude change between stationary values, Δ(t), and noise standard deviation, $\sigma_{mes}$, giving:

$$p(Y = + \mid t, \sigma_{mes}) = \frac{1}{2}\left(1 + \mathrm{erf}\left(\frac{pol(t) \cdot \Delta(t)}{2\sigma_{mes}}\right)\right), \quad (8)$$

where the standard deviation from eq. (7) has been multiplied by √2 to account for using the amplitude change between maximum and minimum, rather than the noise amplitude as described in Section 2.1. This PDF has been marginalized (Section 1.3, Sivia 2000) with respect to the measurement noise, but retains dependence on the noise standard deviation ($\sigma_{mes}$). However, it is also necessary to marginalize for the arrival-time error to account for this uncertainty in the arrival time. This uncertainty depends on the arrival, but could be based on the perceived quality of the pick on some scale such as the common 0-4 scale (best-worst) from HYPO71 (Lee & Lahr 1975).

A possible, although perhaps arbitrary, probability distribution for pick accuracy is a Gaussian distribution around the pick. However, the method described below is independent of the form of distribution chosen. For a Gaussian distribution around the pick, the probability that the arrival time is actually at t for a given arrival-time pick (τ) with standard deviation ($\sigma_\tau$) is:

$$p(t \mid \tau, \sigma_\tau) = \frac{1}{\sqrt{2\pi\sigma_\tau^2}} e^{-\frac{(t-\tau)^2}{2\sigma_\tau^2}}. \quad (9)$$

The arrival-time standard deviation is related to the arrival-time uncertainty, and can be set either as a mapping from the pick quality or from an arrival detection PDF, as discussed in Section 3.

The PDF for the polarity of an arrival is, therefore, given by the product of the polarity probabilities (eq. 8), and the time probabilities (eq. 9):

$$p(Y = + \mid t, \tau, \sigma_{mes}, \sigma_\tau) = \frac{1}{2}\left(1 + \mathrm{erf}\left(\frac{pol(t) \cdot \Delta(t)}{2\sigma_{mes}}\right)\right) p(t \mid \tau, \sigma_\tau), \quad (10)$$

$$p(Y = - \mid t, \tau, \sigma_{mes}, \sigma_\tau) = \frac{1}{2}\left(1 + \mathrm{erf}\left(\frac{-pol(t) \cdot \Delta(t)}{2\sigma_{mes}}\right)\right) p(t \mid \tau, \sigma_\tau). \quad (11)$$

If a Gaussian arrival-time PDF (eq. 9) is used, the PDFs from eqs (10) and (11) are given by:

$$p(Y = + \mid t, \tau, \sigma_{mes}, \sigma_\tau) = \frac{1}{2}\left(1 + \mathrm{erf}\left(\frac{pol(t) \cdot \Delta(t)}{2\sigma_{mes}}\right)\right) \frac{1}{\sqrt{2\pi\sigma_\tau^2}} e^{-\frac{(t-\tau)^2}{2\sigma_\tau^2}}, \quad (12)$$

$$p(Y = - \mid t, \tau, \sigma_{mes}, \sigma_\tau) = \quad (13)$$

$$\frac{1}{2}\left(1 + \mathrm{erf}\left(\frac{-pol(t) \cdot \Delta(t)}{2\sigma_{mes}}\right)\right) \frac{1}{\sqrt{2\pi\sigma_\tau^2}} e^{-\frac{(t-\tau)^2}{2\sigma_\tau^2}}.$$

These PDFs are still time dependent, but this can be marginalized by integrating over all possible arrival times. In most cases, it is sufficient to take large limits ($t_{min}$ and $t_{max}$) compared to the width of the arrival-time PDF, where the arrival-time PDF is approximately zero:

$$p(Y = + \mid \tau, \sigma_{mes}, \sigma_\tau) = \quad (14)$$

$$\int_{t_{min}}^{t_{max}} \frac{1}{2}\left(1 + \mathrm{erf}\left(\frac{pol(t) \cdot \Delta(t)}{2\sigma_{mes}}\right)\right) \frac{1}{\sqrt{2\pi\sigma_\tau^2}} e^{-\frac{(t-\tau)^2}{2\sigma_\tau^2}} dt.$$

In the case of a Gaussian arrival-time PDF, suitable limits are $\tau \pm 10\sigma_\tau$, which have probabilities that are approximately zero ($\sim 10^{23}$). Similar marginalization of the PDF from eq. (13) gives the probability of a negative arrival, $p(Y=\mid \tau, \sigma_{mes}, \sigma_\tau)$.

The probabilities calculated by marginalizing with respect to time are normalized provided the arrival-time PDF (eq. 9) is normalized. This is clear because the anti-symmetry of the error function, erf, means that the sum of the amplitude probabilities is time independent and sums to unity:

$$p(Y = + \mid \tau, \sigma_{mes}, \sigma_\tau) + p(Y = - \mid \tau, \sigma_{mes}, \sigma_\tau) = \int_{t_{min}}^{t_{max}} p(t \mid \tau, \sigma_\tau) dt, \quad (15)$$

$$p(Y = + \mid \tau, \sigma_{mes}, \sigma_\tau) + p(Y = - \mid \tau, \sigma_{mes}, \sigma_\tau) \approx 1. \quad (16)$$

When the uncertainty, $\sigma_\tau$, in the Gaussian arrival-time PDF (eq. 9) increases, more stationary points on the waveform have non-zero arrival-time probabilities, and the arrival-time PDF is flattened. This can be seen in FIG. 2, which shows that for a synthetic arrival, when the arrival-time uncertainty and noise level are increased, the probabilities tend towards 0.5.

FIG. 3 shows the different steps for evaluating the polarity probabilities for an example synthetic arrival with white noise. The calculated probabilities for the pick are: $p(Y=+\mid \tau, \sigma_{mes}, \sigma_\tau)=0.33$, and $p(Y=\mid \tau, \sigma_{mes}, \sigma_\tau)=0.67$.

The approach described herein is not intended to produce a first motion estimate in the former binary classification, but instead to leave the results as probabilities directly.

Nevertheless, it is possible to map the probabilities to the binary polarities, as may be desirable for event classification. In this case, some significance level should be chosen for assigning the polarity values, $$Y = \begin{cases} +1 & p(Y = + \mid \tau, \sigma_{mes}, \sigma_\tau) \geq q \\ 0 & q > p(Y = + \mid \tau, \sigma_{mes}, \sigma_\tau) > 1 - q, \\ -1 & p(Y = + \mid \tau, \sigma_{mes}, \sigma_\tau) \leq 1 - 1 \end{cases} \quad (17)$$

where q is a manually chosen probability value which reflects the desired confidence in the polarity direction estimation. In this case the values between q and 1 q have been assigned a polarity of 0, corresponding to no reported measurement, rather than zero polarity. Alternatively, the probabilities could be represented graphically as shown in Section 4, allowing for easy comparison between different events.

2.3 Choosing the Arrival-Time PDF

This approach is independent of the choice of time PDF. When using automated picking, the PDF can be chosen based on both the automated picker used and any observed shifting produced in a manual review of the picks (Section 3). The arrival-time PDF should have significant probability over the onset of the arrival, rather than the whole arrival, as this can lead to large numbers of stationary points with significant arrival-time probabilities, leading to an uncertain polarity probability estimate.

FIG. 1 shows a histogram of P and S arrival-time shifts for the coalescence microseismic mapping (CMM) autopicker (Drew et al. 2005, 2013) for all pick weights. The mean shift is non-zero, likely due to poor-quality picks that are improved manually and the CMM tendency to pick on the peak rather than the onset. Therefore, the choice of a Gaussian probability around the CMM pick is not a poor one, although the mean could be chosen to be a small time shift ($\delta t$) before the automatic pick, to compensate for the CMM tendency to pick slightly late:

$$p(t \mid \tau, \sigma_\tau) = \frac{1}{\sqrt{2\pi\sigma_\tau^2}} e^{-\frac{(t-\tau+\delta t)^2}{2\sigma_\tau^2}}. \tag{18}$$

The arrival-time PDF must be arrival specific, so as to reflect the confidence in the individual arrival-time estimate, although the shape could be derived from an empirical distribution of arrival times for a subset of events in a data-set, such as that in FIG. 1, with the width scaled by some measure of the arrival-time uncertainty. Alternatively, as discussed below, the arrival-time PDF can be based on some characteristic function of the data, perhaps as used in an automated picker (e.g. short-term averaging/long-term averaging, STA/LTA).

2.4 Manual and Automated Picking

Figure 4:
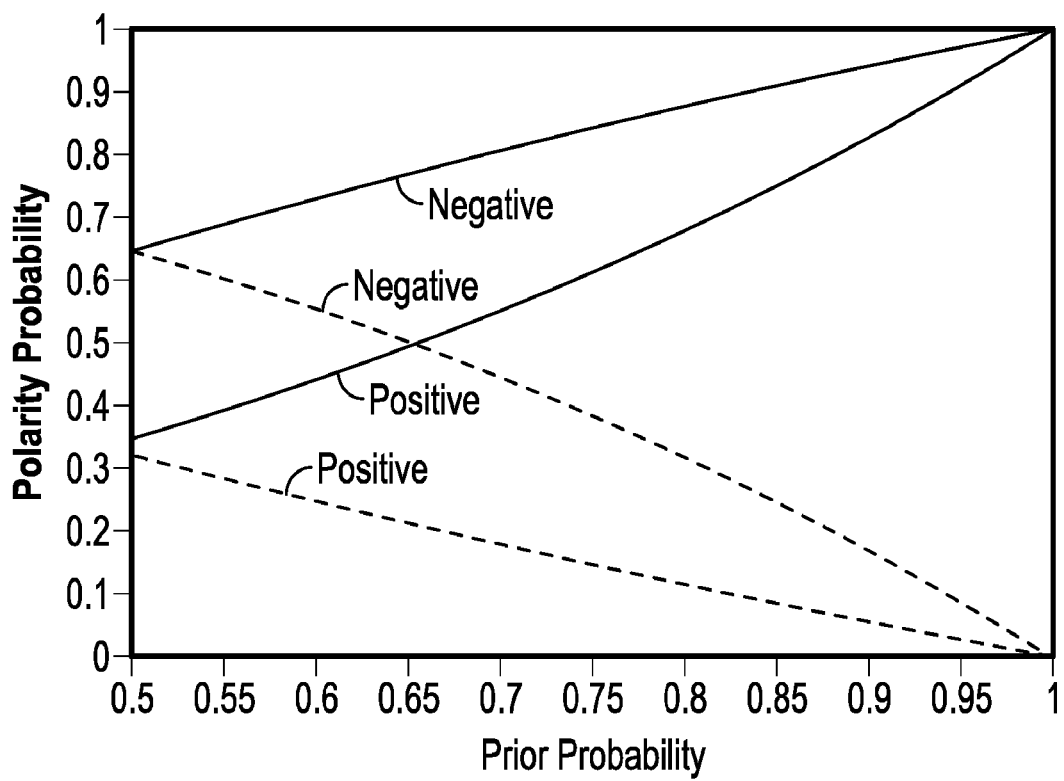
FIG. 4. Polarity probabilities for the arrival from FIG. 3 for different manual prior probabilities. The red lines correspond to the positive polarity probability, and the blue to the negative polarity probability. The solid lines show the probabilities when the manual polarity pick is positive, and the dashed lines show the probabilities for a negative manual polarity pick.

This probabilistic approach produces an estimate of the likelihood of the polarity which can be combined with manual picking by using the manual observations as a prior probability for the automated measurements. The choice of prior probability for the polarity can have a large effect (FIG. 4). If the manual prior is large, the effect of the polarity probabilities is negligible, although as it is reduced to the null prior ($p_{prior}$=0.5), the effect become more significant.

The prior has a strong effect, dominating the probabilities even for the incorrect polarity direction, but there is a clear difference in FIG. 4 between the correct (negative) and incorrect (positive) prior directions, with a much sharper trend towards a value of 1 for the incorrect prior direction. Consequently, even if the prior probability is large and in the incorrect direction, the resultant polarity probability for the correct direction will be larger than the corresponding prior probability value, and the probability is corrected towards the true value.

3 Integration with Automated Monitoring

Figure 2:
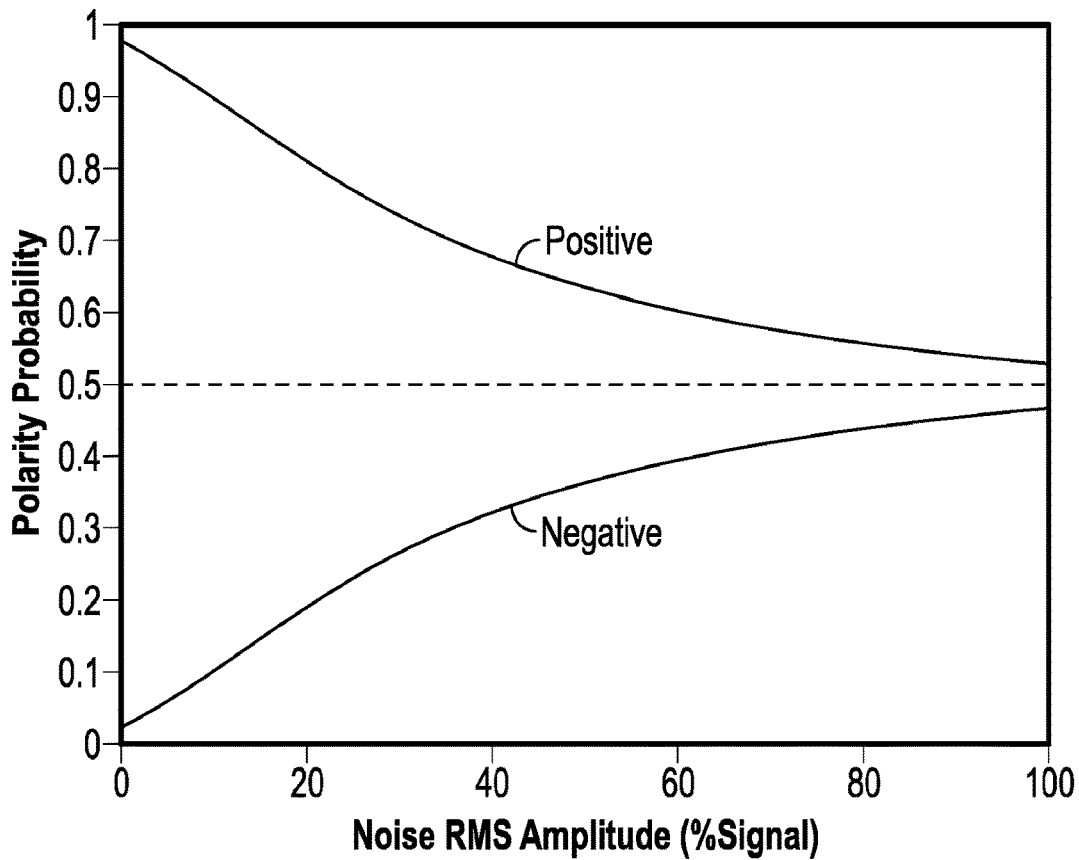
FIG. 2. Distribution of the positive (red) and negative (blue) polarity probabilities for 100000 samples of a simple synthetic trace with added random Gaussian noise. The original waveform had a positive polarity. The time pick was not changed, but the time uncertainty was increased as the noise level increased. The dashed line indicates a 50 percent probability of positive or negative arrival, corresponding to no net information, and the solid lines indicate a smoothed mean of the positive and negative polarity probabilities (e.g. eq. 14).

The fast calculation speed allows this polarity estimation to be integrated into an automated processing workflow. This polarity information, in conjunction with other measurements such as amplitude ratios, can produce an estimate of the event source, allowing for better data quality control from observations and helping to flag interesting events in near real time. The accuracy of such an approach strongly depends on the accuracy of the arrival-time pick. As the error is increased, the polarity probabilities will tend towards 0.5 (FIG. 2). Therefore, provided the automated time picking is accurate, the polarity probabilities produced should show good consistency and, although manual refinement could still improve the result, the results from eq. (14) should improve the source constraints.

Figure 5:
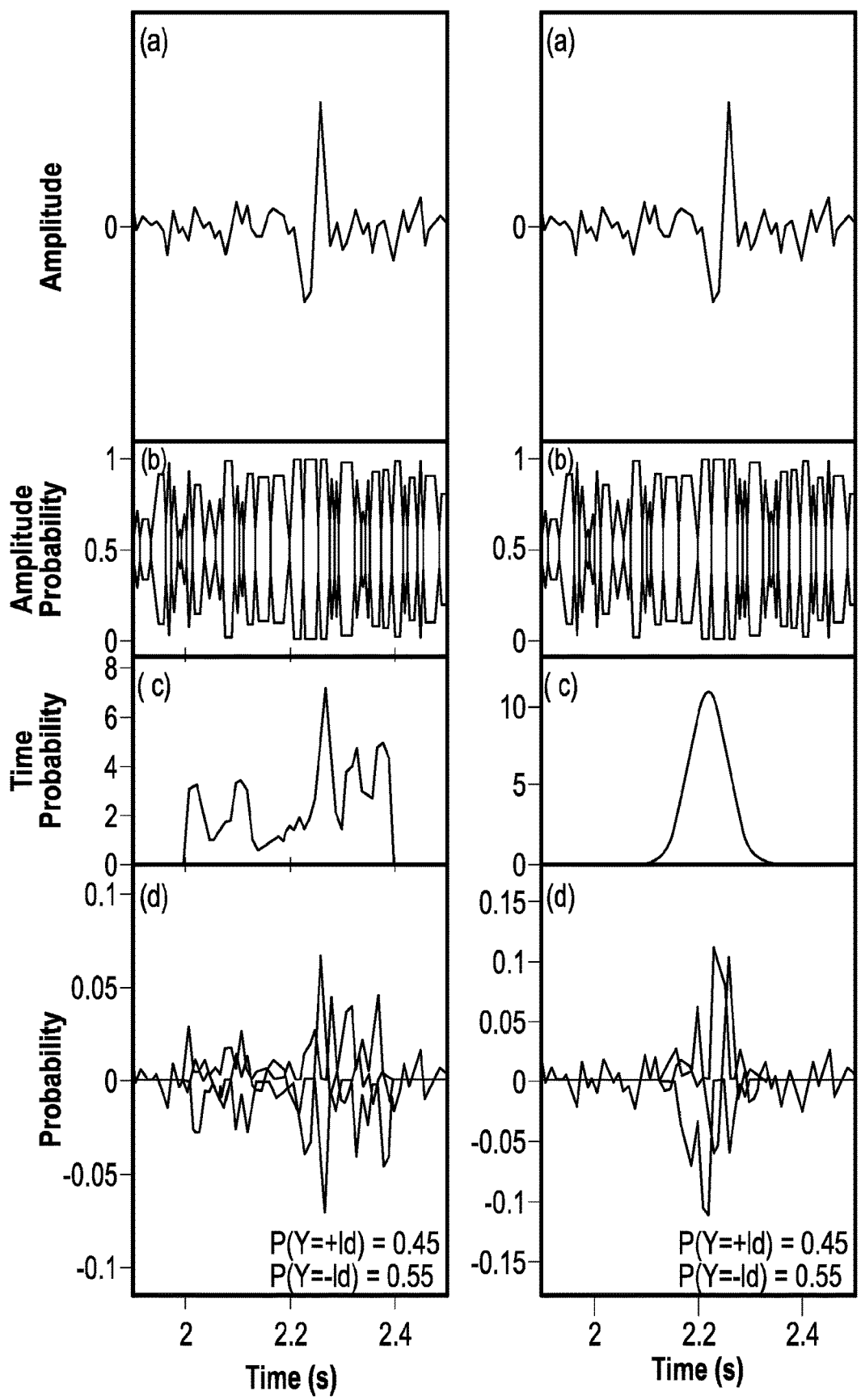
FIG. 5. Plot of the trace and associated PDFs for the different stages, same type of plot as FIG. 3. The left column shows the STA/LTA detection function used as the arrival-time PDF, while the right shows the Gaussian approximation generated from Drew et al. (2013). The STA/LTA parameters chosen were based on those described by Drew et al. (2013, Section 2.1); here, the STA window size is one period of the signal.

The arrival-time PDF can be based on some characteristic function from the chosen automated picking method. The CMM event detection algorithm (Drew et al. 2013) uses an STA/LTA detection function, which could be used as the arrival-time PDF in eqs (10) and (11). In CMM, the detection function is fitted with a Gaussian approximation to produce an uncertainty estimate. However, FIG. 5 shows that using the STA/LTA function (eq. 1, Drew et al. 2013) or its Gaussian approximation often produces wide arrival-time PDFs, encompassing most of the arrival rather than just the first motion. Furthermore, this detection function peaks away from the onset and leads to increased uncertainty in the pick time and, therefore, poorly defined polarity probabilities. Both the Gaussian approximation and the plain STA/LTA function show similar performance, providing little constraint on the polarity. Nevertheless, the maximum probability (FIG. 5$d$) is in the negative direction, which is consistent with the arrival (FIG. 5$a$).

Figure 6:
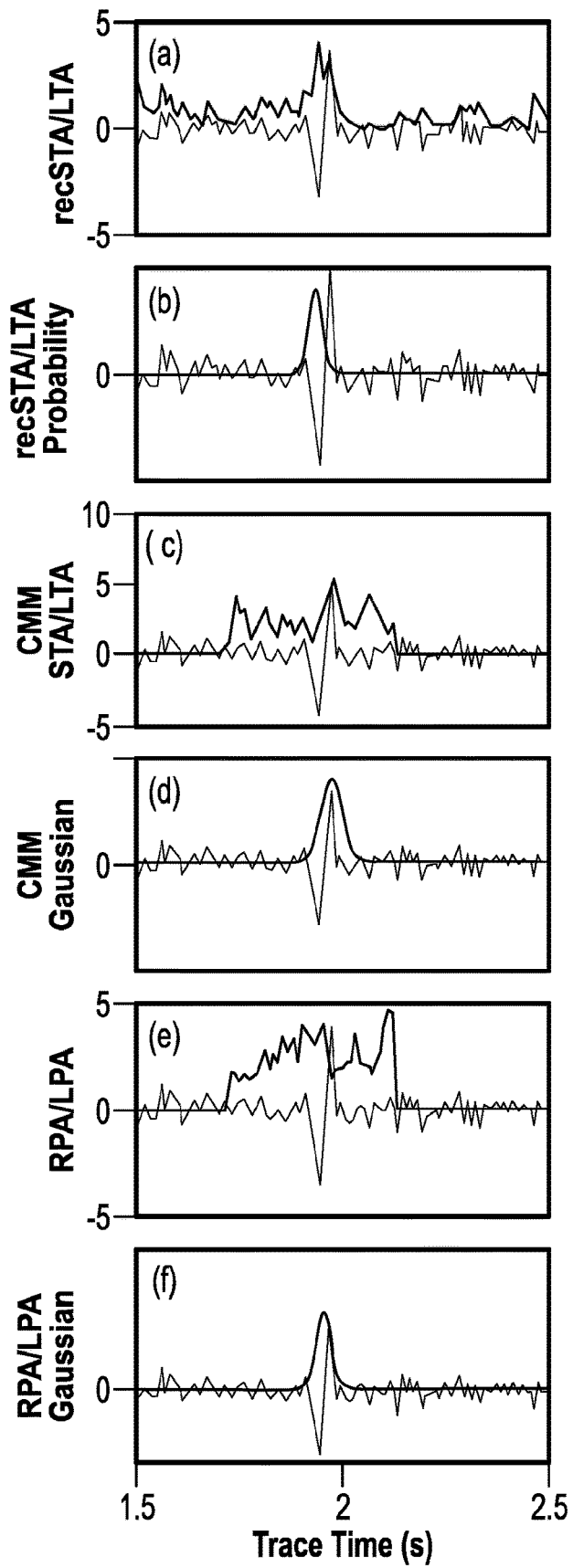
FIG. 6. Example arrival-time PDF constructed from different STA/LTA trigger functions. The onset function is shown in black and the example P-wave arrival is shown in grey. (a) shows the recursive STA/LTA function from ObsPy (Beyreuther et al. 2010). (b) shows the arrival-time PDF given by eq. (19) peaked in the middle of the onset. (c) and (d) show the truncated CMM STA/LTA detection function and the approximated Gaussian. (e) and (f) show the RPA/LPA approach of Zahradnik et al. (2014) and the approximate Gaussian fit using the same approach as for the CMM STA/LTA function.

Baer & Kradolfer (1987) introduced the concept of 'phase detectors' and 'phase pickers'. Phase detectors are relatively imprecise, and will be improved by human re-picking. However, phase pickers should produce results that are comparable to those picked manually. Therefore, it may be better to use a phase picker to determine the onset and construct the arrival-time PDF more accurately. There are many approaches to accurate onset pickers such as the methods discussed by Baer & Kradolfer (1987): STA/LTA pickers (Allen 1978, 1982; Trnkoczy 2012); auto-regressive pickers (Takanami & Kitagawa 1988, 1991; Nakamura 2004); stationary analysis pickers (Nakamula et al. 2007); kurtosis based pickers (Hibert et al. 2014; Ross & Ben-Zion 2014); right to left pick averaging (RPA/LPA) (Zahradnik et al. 2014), as well as many others. Withers et al. (1998) provide an overview of several of these different approaches, as do Di Stefano et al. (2006). Several of the STA/LTA-based approaches are shown in FIG. 6. Determining the parameters for these automated pickers is not always straightforward, and parameters must often be adjusted based on the general signal characteristics (Trnkoczy 2012; Zahradnik et al. 2014).

Many of these approaches produce characteristic functions that have a sharp increase at the onset (Ross & Ben-Zion 2014, FIG. 3). So a possible definition of the arrival-time PDF could be a Gaussian using the size and onset of the peak in the characteristic function ($F_C$) as an indicator of the uncertainty, for example, $$\sigma_\tau = \frac{\tau_{max} - \tau_{min}}{F_C(t=\tau_{max}) - F_C(t=\tau_{min})}, \tag{19}$$

where $\tau_{max}$ is the time of the maximum in the peak, and $\tau_{min}$ is the time of the minimum. FIG. 6($b$) shows an example of this arrival-time PDF for a recursive STA/LTA pick, which is more focussed on the first arrival, rather than the whole of the arrival phase. FIG. 6 shows that neither the CMM STA/LTA nor the RPA/LPA approaches is as good at resolving the arrival as the recursive STA/LTA method.

4 Examples

In the following examples, manual arrival-time picks were made on both the synthetic and real data. The arrival noise levels were measured in a time window from half way between the start of the trace and the P-arrival. The exact window was constructed based on the P arrival-time uncertainty so as to remove any significant probability of any signal occurring in the noise window. The noise estimate is important in eq. (14), but since the stationary points used in this approach are by definition at the extrema of the values, the result from eq. (7) is often close to 1 or 0 (FIG. 3b), so errors in the noise estimate have less effect than errors in the arrival-time uncertainty estimate.

4.1 Polarity PDF Plot

Figure 7:
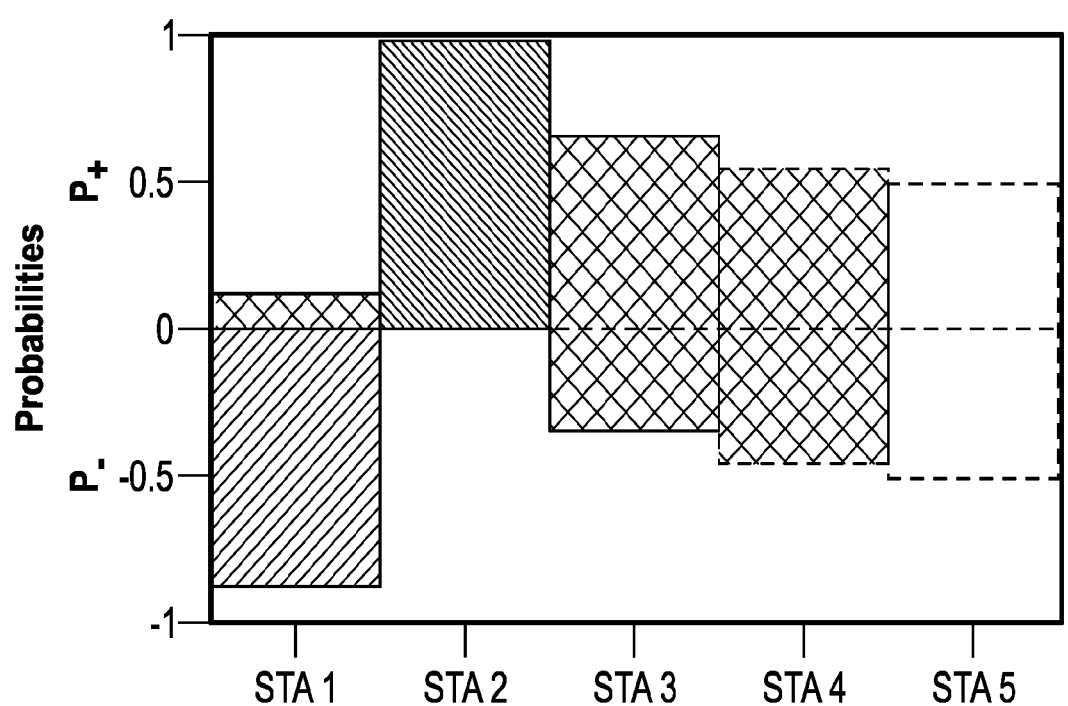
FIG. 7. Example polarity PDF plot; the positive polarity probabilities are given by the length of the bar above the axis and the negative by the length of the bar below the axis. The darker the shading, the better the manual pick quality. The solid bars correspond to manual polarity pick directions, and cross-hatched bars correspond to positive or negative polarities with no manual polarity picks. The station names are given beneath the corresponding observation, on the x-axis. STA1 has $p(Y=|\tau, \sigma_{mes}, \sigma_{\tau})=0.87$ and a pick a quality of 0 on the HYPO71 0-4 (best-worst) scale (Lee & Lahr 1975), along with a manually observed negative polarity. STA2 has $p(Y=+|\tau, \sigma_{mes}, \sigma_{\tau})=0.98$, a pick quality of 1, and a manually observed positive polarity. STA3 has a pick quality of 2 and no manually observed polarity. STA4 has a pick quality of 3 and, again, no manually observed polarity, while STA5 has a pick quality of 4 and no manually observed polarity.

To present both the manual polarity picks and the polarity probability requires a new type of plot. FIG. 7 shows one approach. The positive polarity probabilities are represented as bars above the axis, and the negative below. Darker shading indicates better manual arrival-time pick quality. The solid bars correspond to manual polarity picks, and cross-hatched bars correspond to directions without a manually picked polarity. This allows an easy comparison between the manual polarity picks and the results from this approach.

4.2 Synthetic Examples

Figure 8:
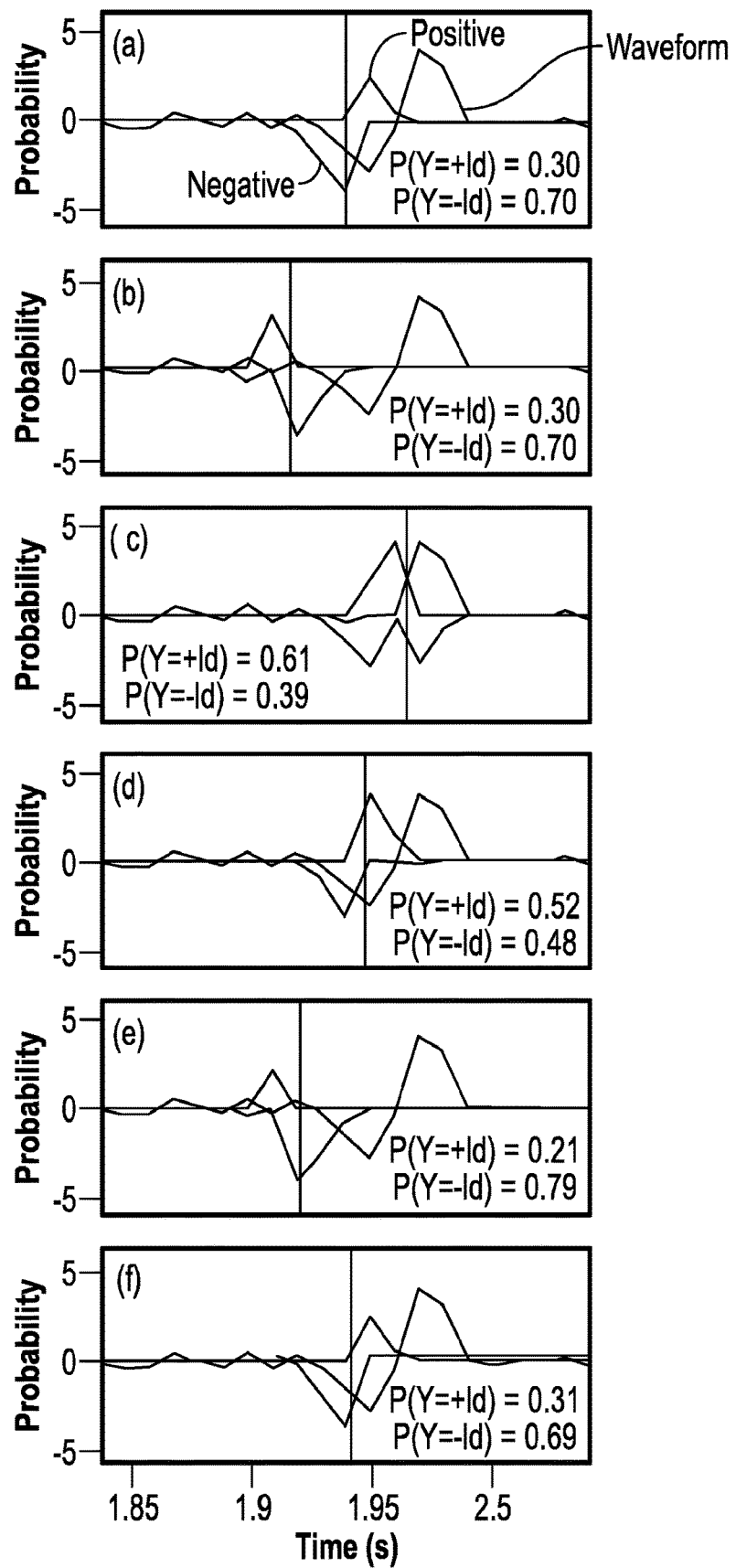
FIG. 8. PDF plots for varying arrival-time picks on the same waveform. The original arrival-time pick is shown in (a), with randomly varied arrival time picks in (b-f). The waveform is shown in grey, with the positive polarity PDF in red and the negative polarity PDF in blue. The vertical lines correspond to the arrival-time picks. The arrival-time picks were varied by adding a time shift randomly sampled from a Gaussian distribution.

The behaviour of the method for different noise levels and arrival-time picks was tested using synthetic arrivals generated by finite difference modelling (Bernth & Chapman 2011). FIG. 8 shows the effects of varying the arrival-time pick on a trace with random Gaussian noise added to give an amplitude SNR of 10. The arrival-time uncertainty was left at the initial value ($\sigma_\tau$=0.01 s=1 sample), meaning that even small variations in the trace could cause large changes in the estimated probability. For this example, the probability of a negative arrival varied between 0.39 and 0.79, with the low probability values not consistent with the observed negative polarity of the arrival without noise. However, the inconsistent probabilities occur due to the arrival-time picks being close to the positive part of the arrival, and later than the true pick. This indicates the importance of accurate arrival-time picks and good characterization of the arrival-time PDFs, either as a Gaussian approximation around the arrival-time pick or using a detection function.

Figure 9:
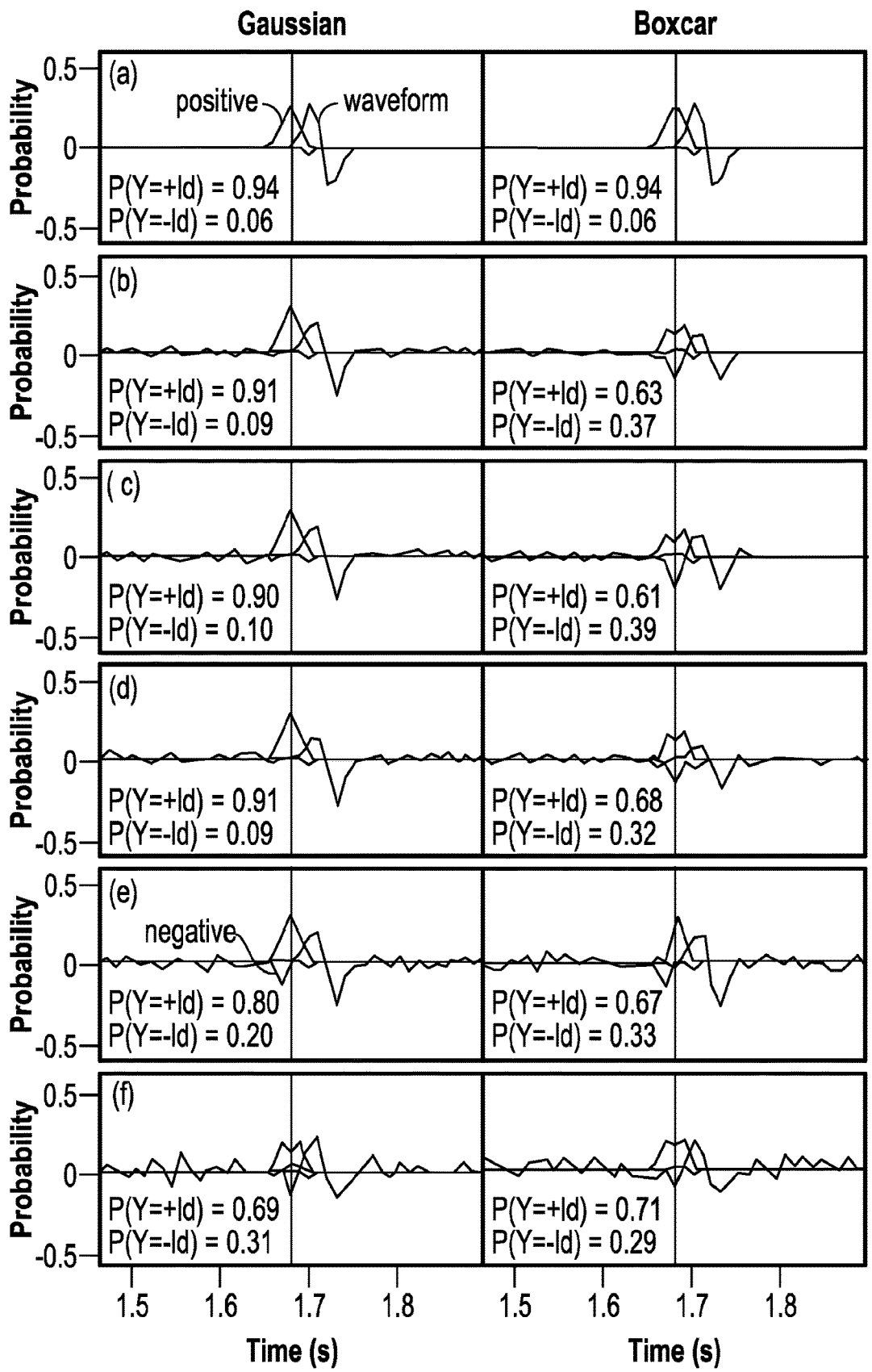
FIG. 9. PDF plots for varying Gaussian and boxcar noise levels for the same waveform. The noise levels are: (a) No noise, (b) SNR=10, (c) SNR=5, (d) SNR=3, (e) SNR=2, and (f) SNR=1.2. The waveform is shown in grey, with the positive polarity PDF in red and the negative polarity PDF in blue. The vertical lines correspond to the arrival-time pick.

The background noise levels for a given pick time were varied using two different noise models: Gaussian and boxcar (FIG. 9). These show that the accuracy is good for low noise levels, but as the noise level approaches that of the signal, the noise can have very large effects on the observed wave form and polarity. There is a small dependence on the noise model, with mainly lower probabilities estimated from the positive polarity for the synthetic arrivals with boxcar noise. However, the values are still consistent with those from the Gaussian noise model, suggesting that the Gaussian noise is not a bad approximation. In practice the traces with low SNR (FIGS. 9d-f) would probably be considered difficult to pick and, therefore, be assigned a larger time pick error.

These examples also demonstrate why an arrival-time PDF with some shift (eq. 18) may be better, as the arrival-time picks in FIGS. 8 and 9 are closer to the onset rather than the first peak. Accordingly, the first motions are more likely to be after the pick time rather than equally likely before and after.

As shown in these examples, the approach is robust and can provide a qualitative value on the probability of the polarity being up or down, but the probabilities are inherently dependent on the accuracy of the arrival-time pick and the trace noise levels. Traces with a high SNR should produce a reliable result, but as the time pick uncertainty increases, the polarity probability tends to 0.5 (FIG. 2).

Figure 10A:
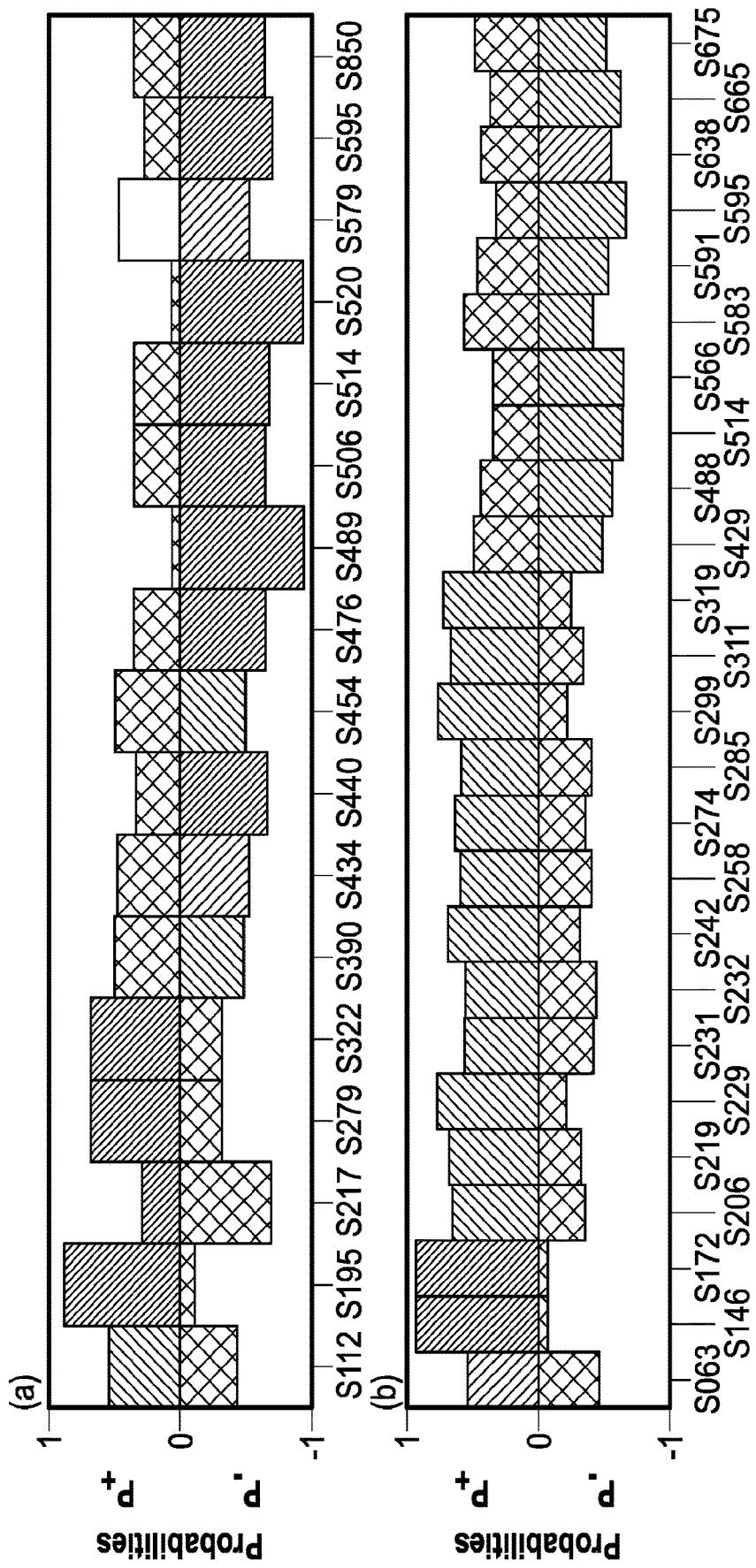
FIG. 10. Polarity PDF plots (FIG. 7) with synthetic events for different numbers of stations and different noise environments. (a) has arrivals with a signal-to-noise ratio around 5, while (b) and (c) have arrivals with a signal-to-noise ratio of 7 and (d) has arrivals with a signal-to-noise ratio around 10.
Figure 10B:
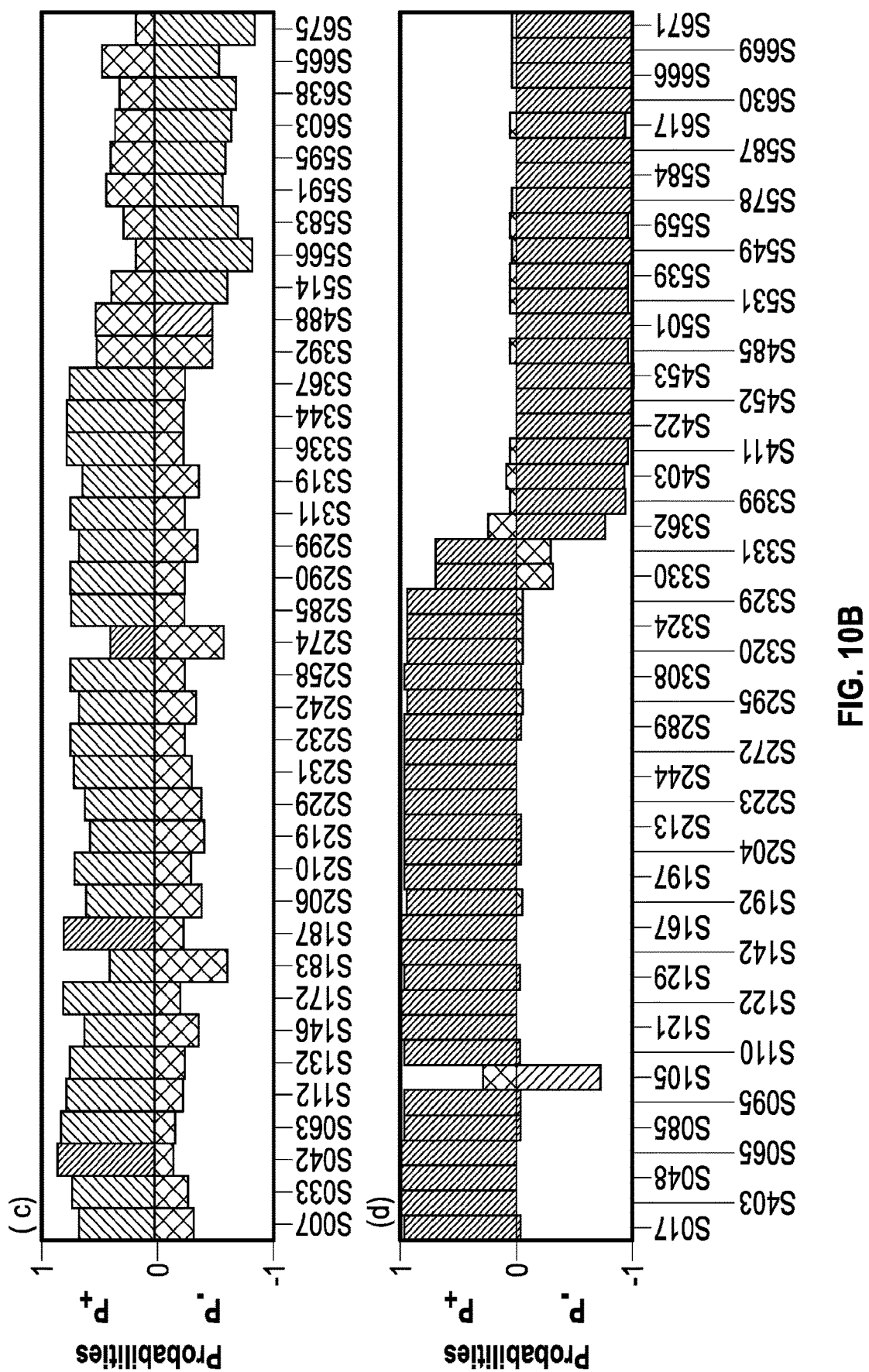

FIG. 10 shows that the automated approach usually agrees with the manually observed polarities, especially in the low-noise cases. However, as the noise levels increase, the solutions occasionally disagree with the manually observed polarities, although this is expected in the low-SNR examples.

Figure 11:
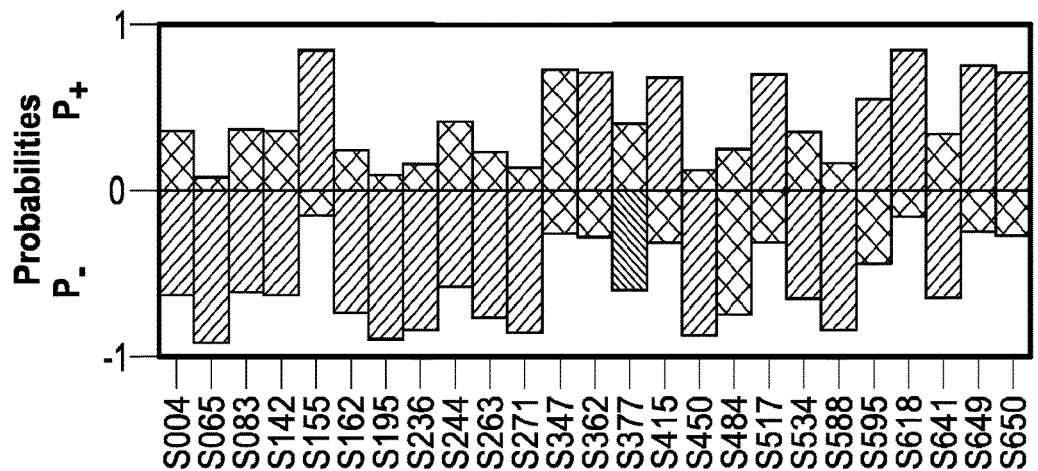
FIG. 11. Polarity PDF plot (FIG. 7) of solutions from SH phase picking of a synthetic event with a signal-to-noise ratio of approximately 5.

This approach can also be used when evaluating S-phase polarities, even though these require rotation into the correct ray orientation to measure them. Consequently, they cannot easily be determined without an estimate of the hypocentre, unlike the P-wave polarities. FIG. 11 shows an example of SH-wave measurements from a synthetic event with an amplitude SNR of 5. The SH polarities were manually picked on the transverse component after the location was determined by rotating into the vertical, radial and transverse (ZRT) components. The noise levels were again estimated by windowing before the arrival. For these observations, any increased signal due to the P-arrival should be considered as noise when estimating the SH-polarity probability, so the window was taken to include the P arrival time. The polarity probabilities show good consistency with the manually picked polarities.

4.3 Real Data

Figure 12:
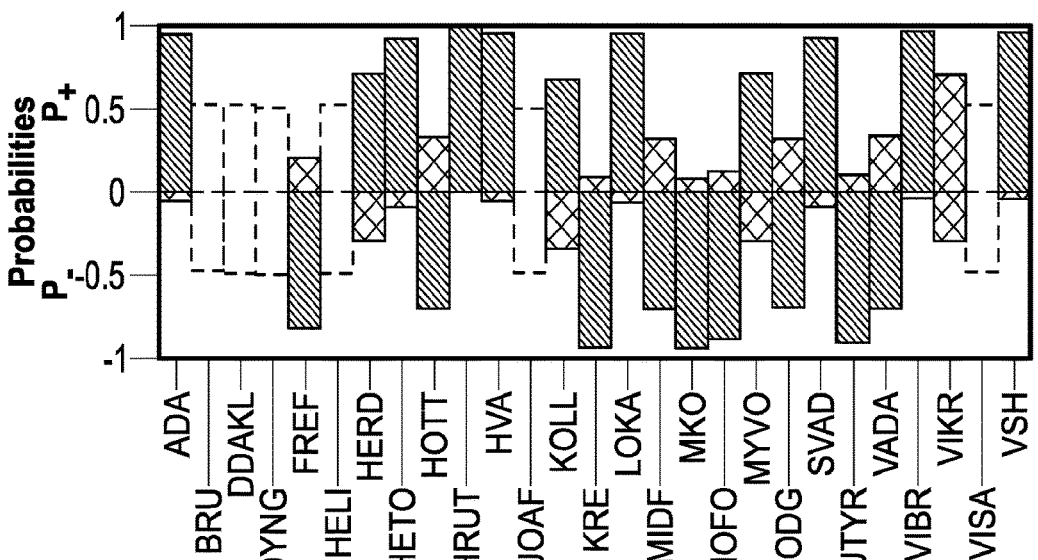
FIG. 12. Polarity PDF plot (FIG. 7) for the 2007/07/06 20:47 event (White et al. 2011) shown in Table 1.
Figure 13:
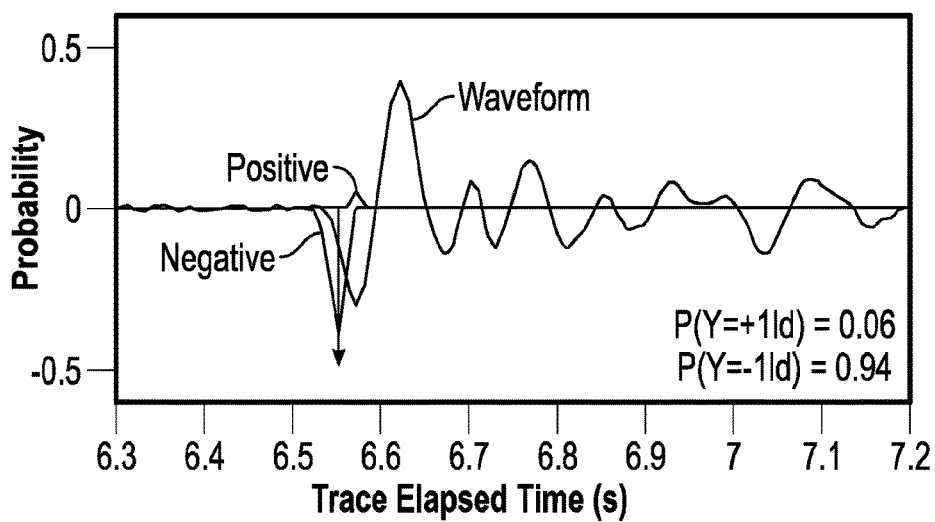
FIG. 13. Example polarity PDFs and waveform from the 2007/07/06 20:47 event for station KRE. The positive polarity PDF is shown in red and the negative polarity PDF is shown in blue and as negative for clarity. The (scaled) waveform is in grey; the P-arrival-time pick and manual polarity pick are indicated by the arrow. The time-marginalized automated polarity probabilities are $p(Y=+|\tau, \sigma_{mes}, \sigma_{\tau})=0.06$ and $p(Y=|\tau, \sigma_{mes}, \sigma_{\tau})=0.94$.

Table 1 shows a comparison between the automated and manual polarity picks for one event from a July 2007 swarm beneath Mount Upptyppingar in Iceland (White et al. 2011), with the polarity PDF plot shown in FIG. 12. The manual observations and automatically determined solutions are consistent with good-quality arrival-time picks producing probabilities larger than 0.7 and often larger than 0.9. The poor picks with large time uncertainties show that the resulting probabilities tend to 0.5 each, as discussed in Section 2. FIG. 13 shows an example polarity PDF for one of the stations.

TABLE 1

Comparison of automated and manual polarity picks for the 2007/7/6 20:47 Upptyppingar event (White et al. 2011). Missing manual polarities are unpicked. Time pick qualities are manually assigned as good or poor with associated time pick errors of 0.01 s and 0.5 s. These qualities would correspond to 0 and 3 from the HYPO71 pick weighting (Lee & Lahr 1975). $p(Y = +|\tau, \sigma_{mes}, \sigma_\tau)$ is the probability of a positive polarity and $p(Y = -|\tau, \sigma_{mes}, \sigma_\tau)$ the probability of a negative polarity. The bolded probabilities correspond to values larger than 0.6 which agree with the manual polarity pick for good (pick quality 0) picks.

| Station | Time pick quality | Manual polarity | $p(Y = +|\tau, \sigma_{mes}, \sigma_\tau)$ | $p(Y = -|\tau, \sigma_{mes}, \sigma_\tau)$ |
|---|---|---|---|---|
| ADA | Good | + | 0.94 | 0.06 |
| BRU | Poor | + | 0.51 | 0.49 |
| DDAL | Poor | | 0.50 | 0.50 |
| DYNG | Poor | − | 0.50 | 0.50 |
| FREF | Good | − | 0.19 | 0.81 |
| HELI | Poor | | 0.50 | 0.50 |
| HERD | Good | + | 0.70 | 0.30 |
| HETO | Good | + | 0.90 | 0.10 |
| HOTT | Good | − | 0.30 | 0.70 |
| HRUT | Good | + | 0.99 | 0.01 |
| HVA | Good | + | 0.94 | 0.06 |
| JOAF | Poor | | 0.50 | 0.40 |
| KOLL | Good | + | 0.65 | 0.35 |
| KRE | Good | − | 0.06 | 0.94 |
| LOKA | Good | + | 0.94 | 0.06 |

TABLE 1-continued

Comparison of automated and manual polarity picks for the 2007/7/6 20:47 Upptyppingar event (White et al. 2011). Missing manual polarities are unpicked. Time pick qualities are manually assigned as good or poor with associated time pick errors of 0.01 s and 0.5 s. These qualities would correspond to 0 and 3 from the HYPO71 pick weighting (Lee & Lahr 1975). $p(Y = +|\tau, \sigma_{mes}, \sigma_\tau)$ is the probability of a positive polarity and $p(Y = -|\tau, \sigma_{mes}, \sigma_\tau)$ the probability of a negative polarity. The bolded probabilities correspond to values larger than 0.6 which agree with the manual polarity pick for good (pick quality 0) picks.

| Station | Time pick quality | Manual polarity | $p(Y = +\|\tau, \sigma_{mes}, \sigma_\tau)$ | $p(Y = -\|\tau, \sigma_{mes}, \sigma_\tau)$ |
|---------|------|---|------|------|
| MIDF | Good | − | 0.30 | 0.70 |
| MKO  | Good | − | 0.06 | 0.94 |
| MOFO | Good | − | 0.10 | 0.90 |
| MYVO | Good | + | 0.70 | 0.30 |
| RODG | Good | − | 0.30 | 0.70 |
| SVAD | Good | + | 0.90 | 0.10 |
| UTYR | Good | − | 0.09 | 0.91 |
| VADA | Good | − | 0.30 | 0.70 |
| VIBR | Good | + | 0.94 | 0.06 |
| VIKR | Good |   | 0.69 | 0.31 |
| VISA | Poor |   | 0.50 | 0.50 |
| VSH  | Good | + | 0.94 | 0.06 |

Figure 14A:
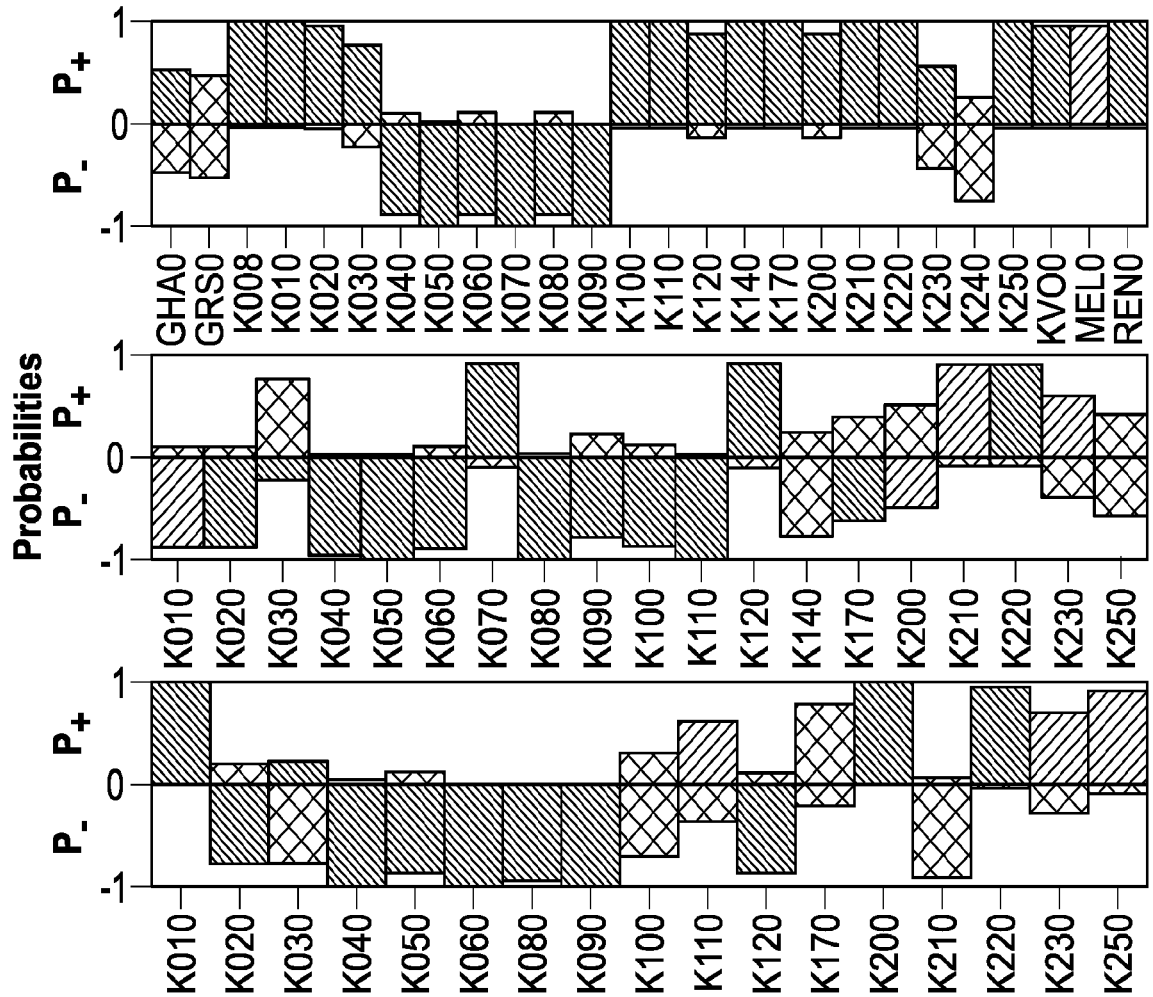
FIG. 14. Polarity PDF plots (FIG. 7) for example events from the Krafla central volcano in the Northern Volcanic Zone of Iceland.
Figure 14B:
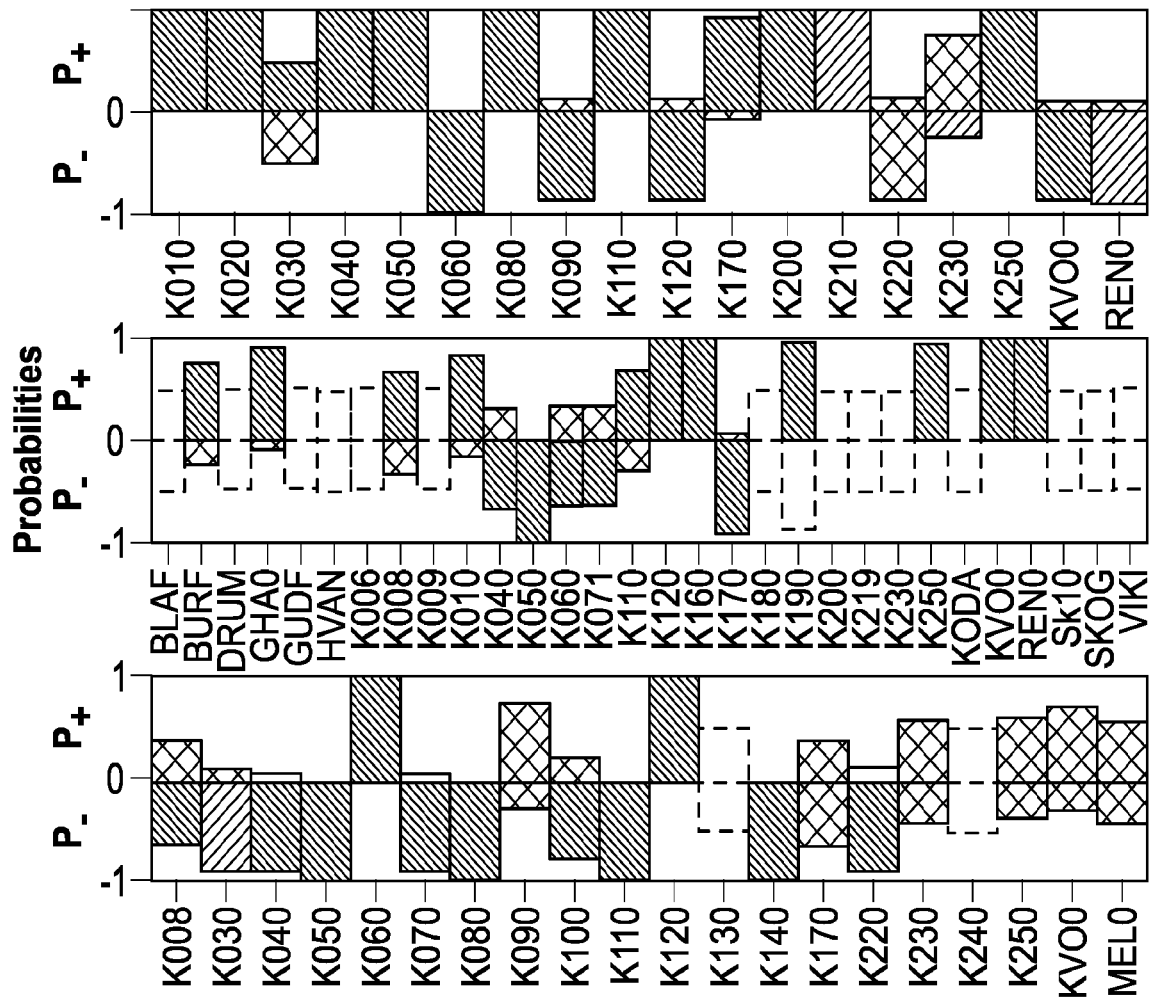
Figure 15:
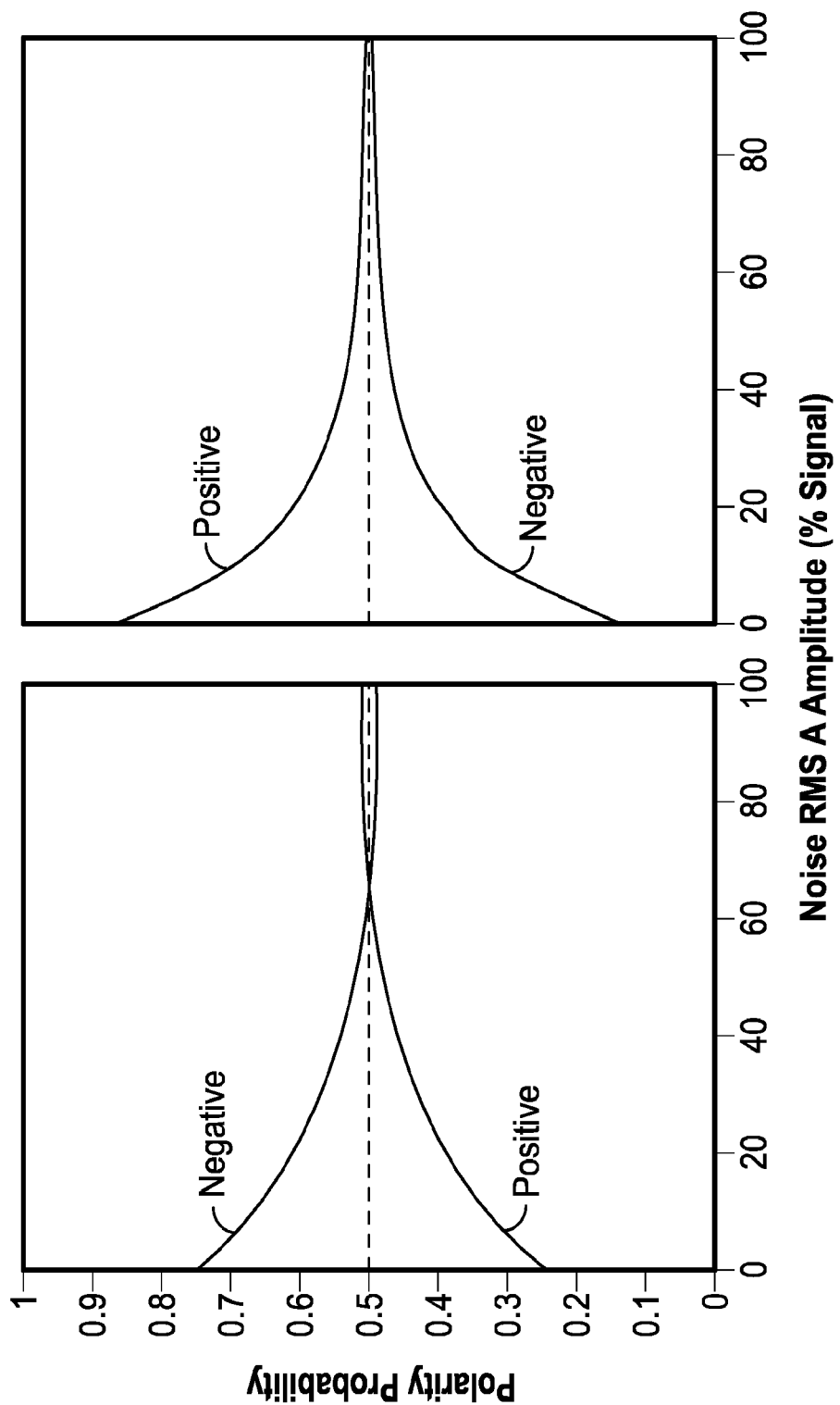
FIG. 15. Distribution of the positive (red) and negative (blue) polarity probabilities for 100000 samples of two real traces from Upptyppingar and Krafla, left and right columns, respectively, with added random Gaussian noise. The original waveform for the left plot had a negative polarity, and the right plot had a positive polarity. The arrival-time pick position was not changed, but the time uncertainty was increased as the noise level increased. The dashed line indicates a 50 percent probability of positive or negative arrival, corresponding to no net information, and the solid lines indicate a smoothed mean of the positive and negative polarity probabilities.
Figure 16:
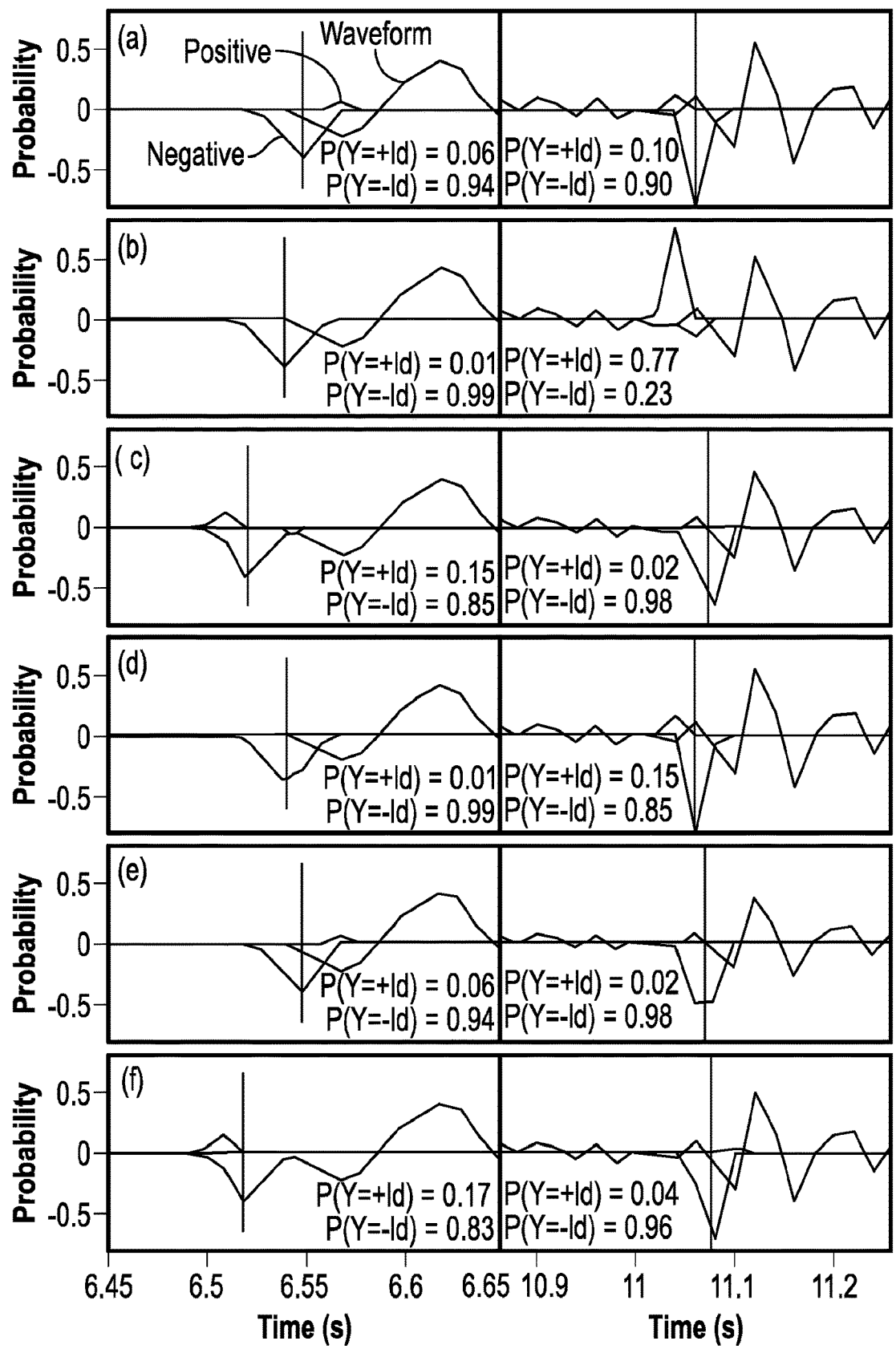
FIG. 16. PDF plots for varying arrival-time picks for two real waveforms from Upptyppingar and Krafla, left and right columns, respectively. The original arrival-time pick is shown in (a), with randomly varied arrival-time picks in (b-f). The waveform is shown in grey, with the positive polarity PDF in red and the negative polarity PDF in blue. The vertical lines correspond to the arrival-time pick. The arrival-time picks were varied by adding a time shift randomly sampled from a Gaussian distribution.
Figure 17:
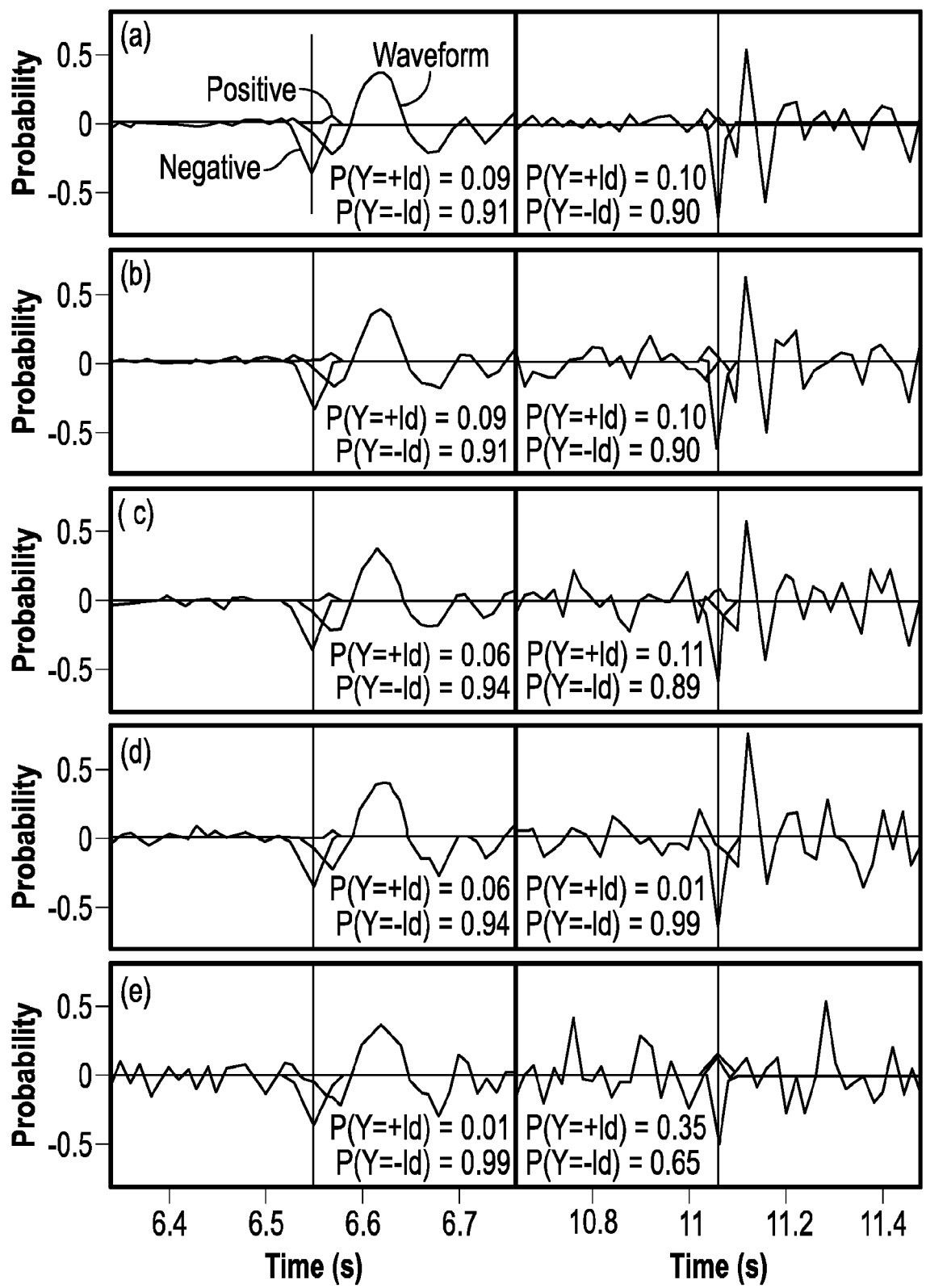
FIG. 17. PDF plots for varying Gaussian noise levels on two real waveforms from Upptyppingar and Krafla, left and right columns, respectively. The noise levels are: (a) SNR=10, (b) SNR=5, (c) SNR=3, (d) SNR=2, and (e) SNR=1.2. The waveform is shown in grey, with the positive polarity PDF in red and the negative polarity PDF in blue. The vertical lines correspond to the arrival-time pick.

The results of the automated polarity picking for several events from the Krafla region of Iceland are shown in FIG. 14. For the most part, the automated polarity probabilities agree with the manual polarities; although there a few cases that disagree; these are usually caused by an error in the manual arrival-time pick. This error made the arrival-time PDF a poor approximation, often due to early or late picks being assigned a high pick quality, leading to narrow arrival-time PDFs before or after the first arrival. The strong agreement of the observations suggests that this approach works well with real data and not just with synthetically generated events. FIG. 15 shows the results from testing the polarity probability estimation with added noise levels on two traces from the Upptyppingar and Krafla data shown above. The results are consistent with those shown in FIG. 2, although there is a faster decay to the 0.5 probability line, and a wider spread of results, due to the more complex signal. FIGS. 16 and 17 show the effects of varying the time pick and noise level on the real data, and again the results are consistent with those shown in FIGS. 8 and 9.

5 Source Inversion

The Bayesian approach proposed by Pugh et al. (2016) can easily be extended to include the automated polarity observations. The PDF for the observed polarity at a given time is dependent on the theoretical amplitude (A), the measurement uncertainty ($\epsilon(t)$), and the observed amplitude change ($\Delta(t) \geq 0$) (cf. eq. 1):

$$p(pol(t) \mid A, \Delta(t), \epsilon(t), t) = H\left(pol(t)\left(A + \frac{\epsilon(t)}{\Delta(t)}|A|\right)\right). \quad (20)$$

The theoretical amplitude depends on the source model.

Given that the standard deviation of the background noise ($\alpha$) can be estimated, the simplest noise model for the uncertainty, $\epsilon(t)$, on $\Delta(t)$ is a Gaussian distribution, with standard deviation $\sqrt{2}\sigma$ due to $\Delta(t)$ corresponding to the amplitude change. Marginalizing with respect to the uncertainty gives (cf. eq. 4):

$$p(Y(t) = pol(t) \mid A, \Delta(t), \sigma, t) = \quad (21)$$

$$\int_{-\infty}^{\infty} \frac{H\left(pol(t)\left(A + \frac{\epsilon(t)}{\Delta(t)}|A|\right)\right)}{\sqrt{2\pi\sigma^2}} e^{-\frac{\epsilon(t)^2}{2\sigma^2}} d\epsilon(t).$$

Following Section 2.1, the PDF is:

$$p(Y(t) = pol(t) \mid A, \Delta(t), \sigma, t) = \frac{1}{2}\left(1 + \text{erf}\left(\frac{pol(t)\Delta(t)\text{sgn}(A)}{2\sigma}\right)\right). \quad (22)$$

This is not marginalized with respect to time, but there is a simplification that can be made here. The signum function in the PDF is equivalent to writing the PDF using the Heaviside step function H(x):

$$p(Y(t) = pol(t) \mid A, \Delta(t), \sigma, t) = \quad (23)$$

$$H(A)\frac{1}{2}\left(1 + \text{erf}\left(\frac{pol(t)\Delta(t)}{2\sigma}\right)\right) + H(-A_i)\frac{1}{2}\left(1 + \text{erf}\left(\frac{-pol(t)\Delta(t)}{2\sigma}\right)\right).$$

This form makes it easy to marginalize with respect to time because the modelled amplitude is independent of the time, so the time-marginalized PDF for source inversion is:

$$p(\psi \mid A, \sigma, \tau, \sigma_\tau) = H(A)\psi + H(-A)(1-\psi), \quad (24)$$

where $\psi$ is the time-marginalized positive polarity PDF for the arrival (eq. 14).

As with the manually determined polarity PDF from Pugh et al. (2016), it is possible that there could be a receiver orientation error with probability $\omega$, leading to a flipped polarity, so eq. (24) can be extended to:

$$p(\psi \mid A, \sigma, \tau, \sigma_\tau, \overline{\omega}) = 1 - \overline{\omega} + (2\overline{\omega} - 1)[H(A) + \psi - 2H(A)\psi]. \quad (25)$$

This is the polarity probabilities likelihood, which is included in the Bayesian source inversion by substituting into the source likelihood (Pugh et al. 2016, eqs 17 and 18) to give (using the same nomenclature as Table 2 from Pugh et al. 2016):

$$p(d' \mid M, \tau, k) = \int\int \sum_{j=1}^{M} \prod_{i=1}^{N} \left[p(\psi_i \mid A_i = a_{i:j} \cdot \tilde{M}, \sigma_i, \varpi_i, \tau_i, \sigma_{\tau_i}) \times \right. \quad (26)$$

$$\left. p(R_i \mid A_i = a_{i:j} \cdot \tilde{M}, \sigma_i, \tau_i)\right] \times p(\sigma)p(\varpi)d\sigma d\varpi,$$

for the source likelihood including location uncertainty, and:

$$p(d' \mid M, \tau, k) = \quad (27)$$

$$\int\int \sum_{k=1}^{Q} \sum_{j=1}^{M} \sum_{i=1}^{N} \left[p(\psi_i \mid A_i = a_{i:jk} \cdot \tilde{M}, \sigma_i, \varpi_i, \tau_i, \sigma_{\tau_i}) \times \right.$$

$$\left. p(R_i \mid A_i = a_{i:jk} \cdot \tilde{M}, \sigma_i, \tau_i)\right] \times p(\sigma)p(\varpi)d\sigma d\varpi,$$

for the source likelihood including location and velocity model uncertainty. These PDFs (eqs 26 and 27) have observed data, d' consisting of polarity probabilities, $\psi$, and amplitude ratios, R, and known parameters, k, consisting of the arrival-time errors $\sigma_\tau$, and the ray paths, $a_{i,j}$ for receiver i and location position j, calculated from the station locations and velocity model, with $a_{ijk}$ corresponding to the ray paths for receiver i, source location j and velocity model k. The PDFs are evaluated for the moment tensor, M, with six vector, $\tilde{M}$, with theoretical amplitudes, $A_i$, given by the inner product of the receiver ray paths and the moment tensor six-vector.

Care must be taken with the data independence. Manual polarity observations must only be used in the source inversion in combination with automated polarity observations as a prior, otherwise the resulting source PDF will be artificially sharpened.

This quantitative method for including noise in the polarity determination is unlike the more qualitative approaches for manual polarity observations such as those described by Brillinger et al. (1980), Walsh et al. (2009) and Pugh et al. (2016).

5.1 Examples

Figure 18:
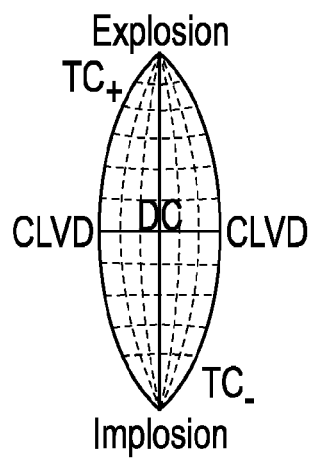
FIG. 18. Example of the fundamental eigenvalue lune (Tape & Tape 2012), showing the position of the different source types. The horizontal axis corresponds to the eigenvalue longitude $\gamma$ ($\pi/6 \leq \gamma \leq \pi/6$) and the vertical axis, the eigenvalue latitude $\delta$ ($\pi/2 \leq \delta \leq \pi/2$). The double-couple point (DC) lies at the intersection of the two lines. TC+ and TC correspond to the opening and closing variants of the tensile crack model (Shimizu et al. 1987). The two compensated linear vector dipole (CLVD) sources (Knopoff & Randall 1970) are also shown on the plot.

The source inversion results for a synthetic double-couple event and a real event from the Upptyppingar dyke swarm in 2007 (White et al. 2011) were evaluated using the Bayesian approach of Pugh et al. (2016), adapted for automated results (eqs 26 and 27). The results for the full moment tensor inversion are plotted on a lune plot (Tape & Tape 2012). FIG. 18 shows the positions of the different source types on the plot.

The results for the source inversion using automated picking resemble those of the manual picking (FIGS. 19-22), but there is usually a wider range of possible solutions because most of the proposed solutions have at least a small non-zero probability. In some cases, the solution can be improved by additional constraint from receivers with no manual polarity pick, but a suitable arrival-time pick. This is shown by the example from the Upptyppingar dyke swarm, which has a few receivers without manual polarity picks but with suitable arrival-time picks to estimate the polarity probabilities.

Figure 20:
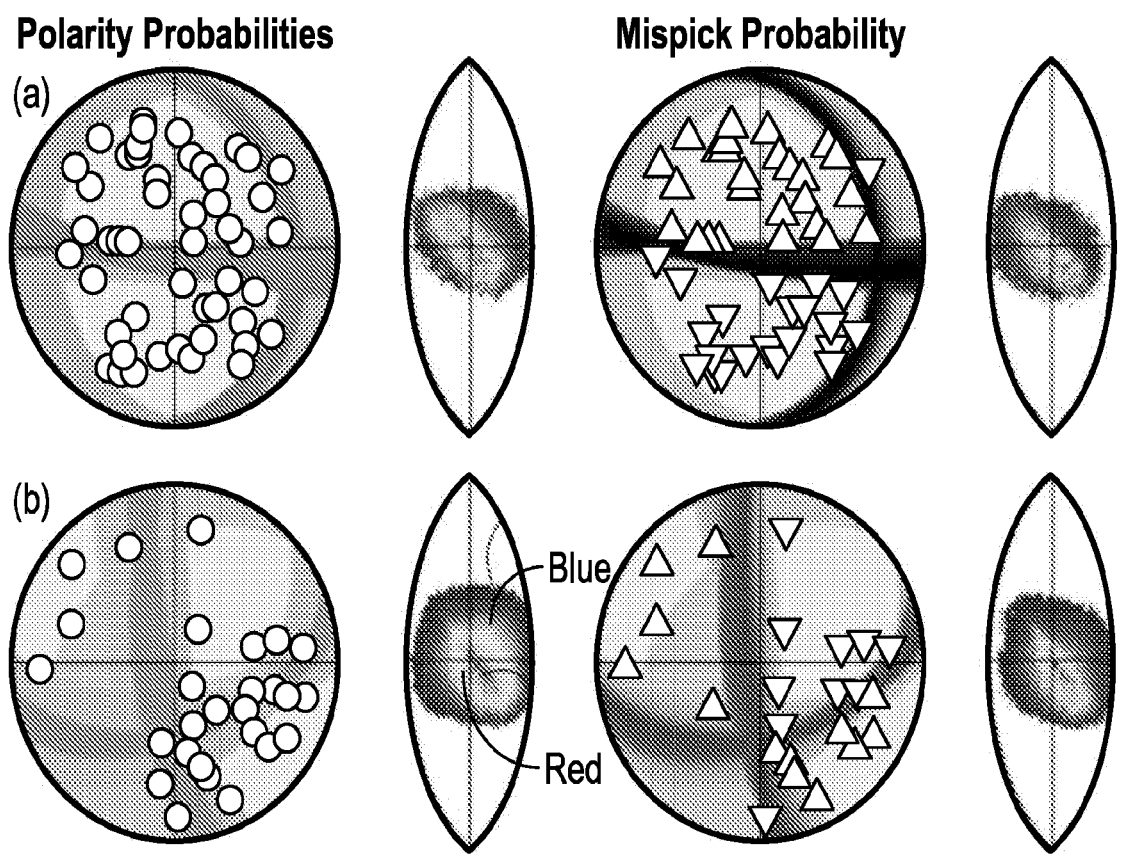
FIG. 20. Comparison of automated polarity and arbitrary probability of a mistaken pick ($p_{mispick}$=0.1) for two events, one synthetic (a) and the event from Table 1 and FIG. 12(b). The first and second columns are the double-couple source PDFs for the automated polarity probabilities and manual polarity observations with mispick, respectively. The third and fourth columns are the full moment tensor PDFs for the automated polarity probabilities and manual polarity observations with mispick, respectively. The fault plane plots show the most likely solutions with the darkest lines. The stations are indicated by circles if there is no manual polarity information used, and upwards red triangles or downwards blue triangles depending on the manually observed polarity. The lune plots are normalized and marginalized to show the most likely source type; red regions correspond to high probability and blue to low probability.

The double-couple solutions from the automated polarity inversion tend to have a clearer demarcation between the high-probability solutions and the lower-probability solutions, as can be seen in FIGS. 19 and 20.

A common approach to dealing with polarity uncertainties is to allow a blanket probability of a pick being incorrect ($p_{mispick}$) (Hardebeck & Shearer 2002, 2003). This is equivalent to setting the value of $\psi$ in eq. (25) to either $1-p_{mispick}$ or $p_{mispick}$ depending on whether the manual pick is positive or negative. Unlike the automated polarity approach, including this arbitrary blanket probability of a mistaken pick cannot account for the most-difficult-to-pick arrivals being most likely to be incorrect. Consequently, the range of solutions is often not overly broad. The double-couple solutions from the automated polarities in FIG. 20 show a stronger demarcation between the low- and high-probability solutions than those using a blanket probability of a mistaken pick, although the ranges are similar. The full moment tensor solutions in FIG. 20 have very similar distributions for both of the inversions, with a less peaked range of solutions than the ordinary manual polarity solutions from the same event shown in FIG. 19.

Figure 21:
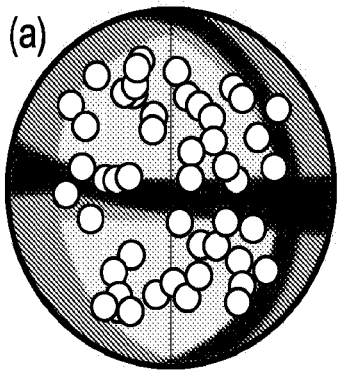
FIG. 21. Comparison of automated polarity using a Gaussian time PDF around the manual time pick and STA/LTA time picking for two events, one synthetic (a) and the event from Table 1 and FIG. 12(b). The first and second columns are the double-couple source PDFs for the Gaussian time PDF and the STA/LTA time PDF, respectively. The third and fourth columns are the full moment tensor PDFs for the Gaussian time PDF and the STA/LTA time PDF, respectively. The fault plane plots show the most likely solutions with the darkest lines. The stations are indicated by circles for the automated polarity probabilities, as no manual polarity information is used, and upwards red triangles or downwards blue triangles depending on the manually observed polarity. The lune plots are normalized and marginalized to show the most likely source type; red regions correspond to high probability and blue to low probability.
Figure 21:
Figure 21:
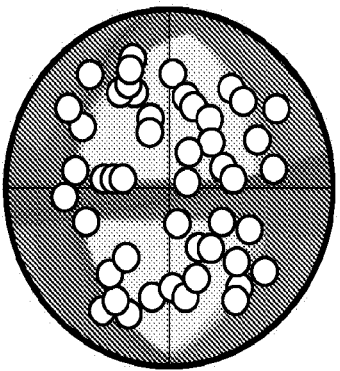
Figure 21:
Figure 21:
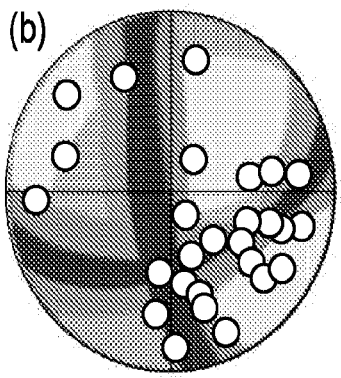
Figure 21:
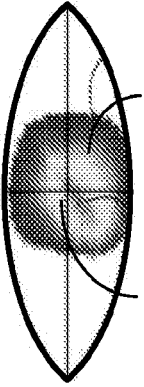
Figure 21:
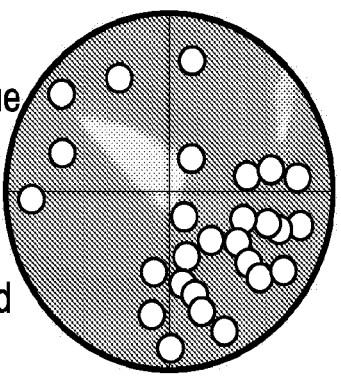
Figure 21:
Figure 22:
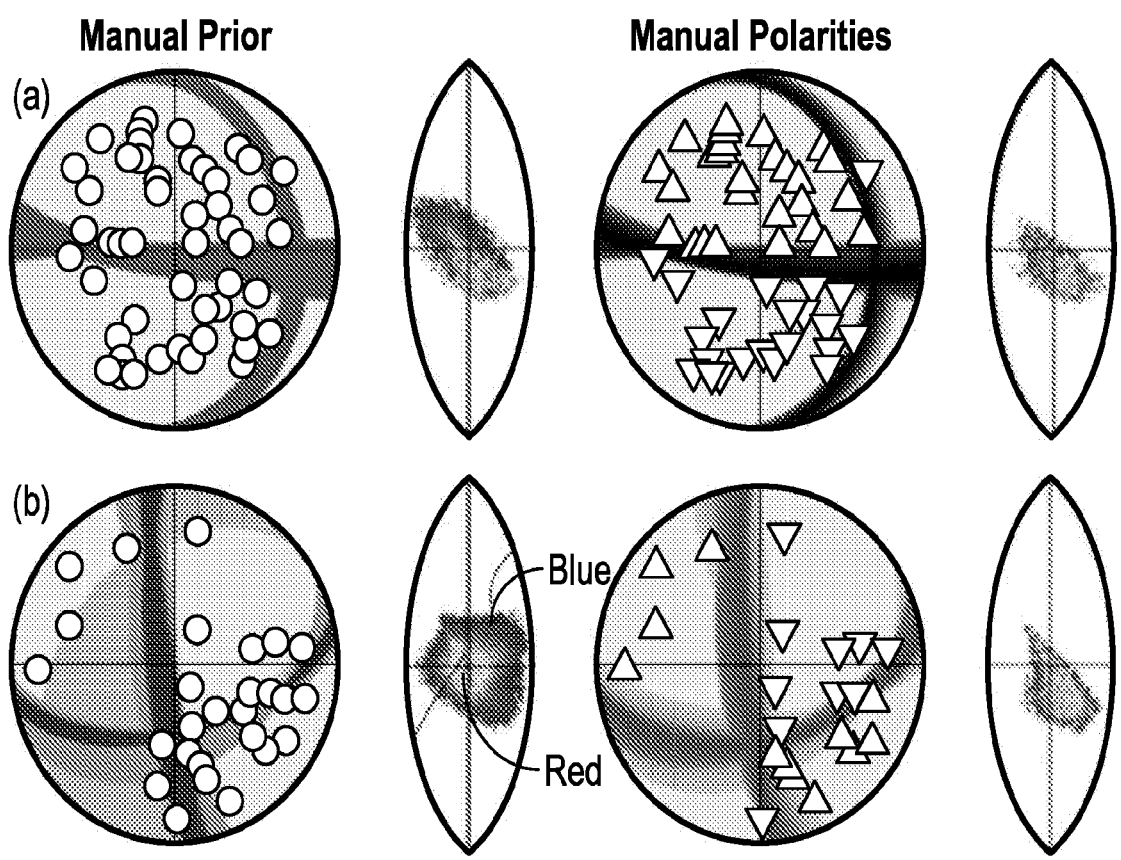
FIG. 22. Comparison of automated polarity using a manual prior of 0.85 and manual polarity source inversions for two events, one synthetic (a) and the event from Table 1 and FIG. 12(b). The first and second columns are the double-couple source PDFs for the automated polarity probabilities with a manual prior and manual polarity observations, respectively. The third and fourth columns are the full moment tensor PDFs for the automated polarity probabilities with a manual prior and manual polarity observations, respectively. The fault plane plots show the most likely solutions with the darkest lines. The stations are indicated by circles for the automated polarity probabilities, as no manual polarity information is used, and upwards red triangles or downwards blue triangles depending on the manually observed polarity. The lune plots are normalized and marginalized to show the most likely source type; red regions correspond to high probability and blue to low probability.

Although the choice of time PDF is independent of the approach, the CMM STA/LTA (FIG. 5) was tested as a possible PDF. FIG. 21 shows that this time PDF can work in low-noise environments, but in a higher-noise environment it may not be possible to determine a solution. This is clear in the solutions for the Upptyppingar event, which has no constraint on the possible source for both the double-couple and full moment tensor inversions because the variations in probability are too low. The low-noise synthetic example shows good agreement with the east-west plane, but the north-south plane has a much larger range of high probability solutions. However, the approach may provide some constraint on the source PDF in the high-noise case if there are enough receivers sampling the focal-sphere. Using an arrival-time PDF from a well calibrated onset picker (Section 3) would provide a much larger improvement in the source constraints. Using manual polarity picks as a prior probability further sharpens the source PDF, leading to a sharper solution than even the manual polarities (FIG. 22). The full moment tensor solutions are also constrained better by the prior, compared to the equivalent solutions in FIG. 19.

6 Summary and Discussion

The Bayesian approach to automated polarity determination proposed above is a quantitative approach that enables rigorous incorporation of measurement uncertainties into the polarity probability estimates. It is an alternative approach to the traditional binary classification of polarities, and can be adapted for use with any onset or arrival-time picking method, either manual or automatic. The polarity probabilities estimated using this method provide a quantitative approach for including the polarity uncertainties in the source inversion. This contrasts with many common approaches, including the qualitative approach for manual polarity observation described by Brillinger et al. (1980), Walsh et al. (2009) and Pugh et al. (2016), and the arbitrarily determined probability of a mistaken pick (Hardebeck & Shearer 2002, 2003).

The polarity probabilities have a clear dependence on the time pick accuracy and the noise level of the trace, requiring an accurate arrival-time pick. Poorly characterized arrival-time pick uncertainties lead to little discrimination in the polarity probabilities. Consequently, when an automated arrival picking approach is used, accurate onset picks with results comparable to picks made by a human are required, otherwise the resultant arrival-time PDF is usually too wide.

The choice of arrival-time PDF can be adjusted depending on the perceived quality of the arrival time picking approach. For an automated picker, the arrival-time PDF peak can be shifted to just before the pick if the automated pick tends to be late, as is the case for the CMM STA/LTA picker. The arrival-time PDF can also be adjusted using the pick quality estimate, such as the pick weight (0-4 range from HYPO71 Lee & Lahr 1975), although a range with finer discretization would prove more accurate.

In the real-world cases from the Upptyppingar volcano and Krafla in Iceland, there are few differences between the results obtained from manual and automated picking. The estimation of the probability of correct first motions produces a quantitative estimate of the uncertainty of the polarities that carries through to the calculation of the resulting source mechanism PDF. In the cases where the automated and manual picks seem to disagree, this can be attributed partially to human error in the arrival time and manual polarity determinations.

The time required for calculating the PDFs is fast compared with that required for manual picking. This approach adds little time to an automated processing workflow, and can be included easily into near-real-time event detection, unlike the much slower manual polarity picking. Additionally, the approach is useful for determining polarities of phases measured on location-dependent seismogram components, such as the SH phase. These are often ignored in source inversion due to the requirement to return and pick the polarities after the event has been located.

7 General Remarks

The above description provides preferred exemplary embodiment(s) only, and is not intended to limit the scope, applicability or configuration of the invention. Rather, the above description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the above description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the above disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

8 Numbered Clauses Relating to the Invention

1. A method for assigning to an unknown onset of a signal in a noisy time series a probability of that onset having a signed excursion away from the trace mean, objectively accounting for noise and onset time uncertainties, according to any one of the embodiments described herein.

1. A method for assigning to the unknown onset of a signal in a noisy time series a probability of that onset having a signed excursion away from the trace mean by:

defining a polarity at a given time sample by reference to the sign of the amplitude difference between the extrema immediately before and immediately after the given time sample in the time series;

defining a positive polarity probability density function by combining the polarity at a given time sample with a statistical weight based on the amplitude difference between the extrema immediately before and immediately after the given time sample, marginalized over the estimated noise in the time series;

defining a negative polarity probability density function consistent with the positive polarity probability density function and the requirement that the instantaneous probability values must sum to unity;

taking the products of the polarity probability density functions with a suitable probability density function of the given time sample corresponding to the onset of the signal;

marginalizing positive and negative polarity probability density functions over time to estimate the final probabilities that the onset has a positive or a negative polarity. 2. A method as in 2 whereby the probability density function can be calculated in near-real-time and used to inform a process decision.

3. A method as in 2 whereby the probability density function for phases, such as SH or SV arrivals, for which the polarity direction projected onto the focal sphere depends on ray path and/or source location, can be calculated in near real time, or after the event, to enable a more quantitative assignment of shear wave polarities on the focal sphere.

4. A method as in 2 whereby the probability density function, $P(+|\sigma_{meas})$, for a positive polarity (+), given a polarity function pol(t), an amplitude change ($\Delta(t)$) between successive extrema, and estimated noise standard deviation $\sigma_{meas}$ can be calculated as:

$$P(+\mid \sigma_{mes}) = \frac{1}{2}\left(1 + \mathrm{erf}\left(\frac{pol(t)\cdot \Delta(t)}{2\sigma_{mes}}\right)\right)$$

REFERENCES

U.S. Pat. No. 5,101,195

Aldersons, F., 2004. Toward a three-dimensional crustal structure of the Dead Sea region from local earthquake tomography, *PhD thesis*, Tel Aviv.

Allen, R. V., 1978. Automatic earthquake recognition and timing from single traces, *Bull. seism Soc. Am.*, 68(5), 1521-1532.

Allen, R. V., 1982. Automatic phase pickers: their present use and future prospects. *Bull seism. Soc. Am.*, 72(6B). S225-S242.

Baer, M. & Kradolfer, U., 1987. An automatic phase picker for local and teleseismic events, *Bull. seism. Soc. Am.*, 77(4), 1437-1445.

Bernth, H. & Chapman, C., 2011. A comparison of the dispersion relations for anisotropic elastodynamic finite-difference grids. *Geophysics*, 76(3), WA43-WA50.

Beyreuther, M., Barsch, R., Krischer, L., Megies, T., Behr, Y. & Wassermann, J., 2010. ObsPy: a Python toolbox for seismology, *Seismol. Res. Lett.*, 81, 530-533.

Brillinger, D. R., Udias, A. & Bolt, B. A., 1980. A probability model for regional focal mechanism solutions, *Bull. seism. Soc. Am.*, 70(1), 149-170.

Byerly, P., 1926. The Montana earthquake of Jun. 28, 1925, G.M.C.T., *Bull. seism. Soc. Am.*, 16(4), 209-265.

Di Stefano, R., Aldersons, F., Kissling, E., Baccheschi, P., Chiarabba, C. & Giardini, D., 2006. Automatic seismic phase picking and consistent observation error assessment: application to the Italian seismicity, *Geophys. J. Int.*, 165(1), 121-134.

Drew, J., Leslie D., Armstrong, P. & Michaud, G., 2005. Automated microseismic event detection and location by continuous spatial mapping, in *Society of Petroleum Engineers Annual Technical Conference and Exhibition*, doi: 10.2118/95513-MS.

Drew, J., White, R. S., Tilmann, F., & Tarasewicz, J., 2013. Coalescence microseismic mapping, *Geophys. J. Int.*, 195(3), 1773-1785.

Hardebeck, J. L. & Shearer, P. M., 2002. A new method for determining first-motion focal mechanisms, *Bull. seism Soc. Am.*, 92(6), 2264-2276.

Hardebeck, J. L. & Shearer, P. M., 2003. Using S/P amplitude ratios to constrain the focal mechanisms of small earthquakes, *Bull. seism Soc. Am.*, 93(6), 2434-2444.

Hibert, C. et al., 2014. Automated identification, location, and volume estimation of rock falls at Piton de la Fournaise volcano, *J. geophys. Res.*, 119, 1082-1105.

Knopoff, L., & Randall. M. J, 1970. The compensated linear-vector dipole; a possible mechanism for deep earthquakes, *J. geophys. Res.*, 75(26), 4957-4963.

Lee, W. H. K. & Lahr. J. C., 1975. HYPO71 (Revised): a computer program for determining hypocenter, magnitude and first motion pattern of local earthquakes, *Tech. Rep.* 300, USGS.

Nakamula, S., Takeo, M., Okabe, Y. & Matsuura, M., 2007. Automatic seismic wave arrival detection and picking with stationary analysis: application of the KM2O-Langevin equations, *Earth Planets Space*, 59(6), 567-577.

Nakamura, M., 2004. Automatic determination of focal mechanism solutions using initial motion polarities of P and S waves, *Phys. Earth planet. Inter.*, 146(3-4), 531-549.

Nakano, H., 1923. Notes on the nature of the forces which give rise to the earthquake motions, *Seismol. Bull. Cent. Met. Obs. Japan.* 1, 92-120.

Pugh, D. J., White, R. S. & Christie, P. A. F., 2016. A Bayesian method for microseismic source inversion, *Geophys. J. Int.*, (submitted).

Reasenberg, P. A. & Oppenheimer, D., 1985. FPFIT, FPPLOT and FPPAGE: Fortran computer programs for calculating and displaying earthquake fault-plane solutions—OFR 85-739, Tech. rep., USGS.

Ross, Z. E. & Ben-Zion, Y., 2014. Automatic picking of direct P, S seismic phases and fault zone head waves, *Geophys. J. Int.*, 199(1), 368-381.

Shimizu. H., Ueki, S. & Koyama. J., 1987. A tensile-shear crack model for the mechanism of volcanic earthquakes, *Tectonophysics*, 144, 287-300.

Sivia, D. S., 2000. *Data Analysis: A Bayesian Tutorial*, Oxford Univ. Press.

Snoke, J. A., 2003. FOCMEC: FOCal MEChanism determinations, Tech. rep.

Takanami, T. & Kitagawa, G., 1988. A new efficient procedure for the estimation of onset times of seismic waves, *J. Phys. Earth*, 36, 267-290.

Takanami, T. & Kitagawa, G., 1991. Estimation of die arrival times of seismic waves by multivariate time series model, *Ann. Inst. Stat. Math.*, 43(3), 403-433.

Tape, W. & Tape. C., 2012. A geometric setting for moment tensors, *Geophys. J. Int.*, 190(1), 476-498.

Trnkoczy, A, 2012. Understanding and parameter setting of STA/LTA trigger algorithm, in *New Manual of Seismological Observatory Practice* 2 (*NMSOP*-2), pp. 1-20, ed. Bormann, P., Deutsches GeorForschungsZentrum GFZ.

Walsh, D., Arnold, R. & Townend, J., 2009. A Bayesian approach to determining and parameterizing earthquake focal mechanisms, *Geophys. J. Int.*, 176(1), 235-255.

White, R. S., Drew. J., Martens, H. R., Key, J., Soosalu, H. & Jakobsdòttir, S. S., 2011. Dynamics of dyke intrusion in the mid-crust of Iceland, *Earth planet, Sci. Lett.*, 304(3-4), 300-312.

Withers, M., Aster, R., Young, C., Beiriger, J., Harris, M., Moore, S. & Trujillo, J., 1998. A comparison of select trigger algorithms for automated global seismic phase and event detection. *Bull. seism. Soc. Am.*, 88(1), 95-106.

Zahradnik, J., Jansky, J. & Plicka. V., 2014. Analysis of the source scanning algorithm with a new P-wave picker, *J. Seismol.*, 19(2), 423-441.

The invention claimed is:

1. A device for determining a focal point source type of an earthquake by assigning to an unknown onset of a signal in a noisy seismic time series a probability of that onset having a signed excursion away from a trace mean, the device comprising:

one or more means arranged to:
define a polarity at a given time sample in the noisy seismic time series by reference to a sign of an amplitude difference between extrema immediately before and immediately after the given time sample;
define a positive polarity probability density function by combining the polarity at the given time sample with a statistical weight based on the amplitude difference between the extrema immediately before and immediately after the given time sample, marginalized over estimated noise in the noisy seismic time series;

define a negative polarity probability density function consistent with the positive polarity probability density function and a requirement that instantaneous positive and negative probability values sum to unity;

take the respective products of the positive and negative polarity probability density functions with an onset probability density function defining a probability that the onset of the signal occurs at a given time sample;

marginalize the respective products of the positive and negative polarity probability density functions with the onset probability density function over time to estimate final probabilities that the onset has a positive or a negative polarity; and using the estimated final probabilities to determine the focal point source types of fractures or faults in a rock formation in response to earthquake events.

2. The device according to claim 1 wherein the probability density function, $P(+|\sigma_{meas})$, for a positive polarity (+), given a polarity function pol(t) that defines the polarity at time t, an amplitude change ($\Delta(t)$) between successive extrema, and an estimated noise standard deviation $\sigma_{meas}$ is a cumulative distribution of the product of polarities and amplitude changes.

3. The device according to claim 1, wherein one or more processors are arranged to define the polarity, define the positive polarity probability density function, define the negative polarity probability density function, take the respective products, and marginalize the respective products for each of plural noisy seismic time series.

4. The device according to claim 1, wherein the noisy seismic time series is a seismogram.

5. The device according to claim 4, wherein the seismogram is a waveform of a pressure wave, a shear wave, a horizontally polarized shear wave or a vertically polarized shear wave.

6. The device according to claim 1 which is a computer system, the one or more means being one or more processors of the computer system.

7. The device according to claim 1 which is a dedicated electronic hardware device.

8. A method for determining a focal point source type of an earthquake by assigning to an unknown onset of a signal in a noisy seismic time series a probability of that onset having a signed excursion away from a trace mean, the method comprising:

defining a polarity at a given time sample in the noisy seismic time series by reference to a sign of an amplitude difference between extrema immediately before and immediately after the given time sample;

defining a positive polarity probability density function by combining the polarity at the given time sample with a statistical weight based on the amplitude difference between the extrema immediately before and immediately after the given time sample, marginalized over estimated noise in the noisy seismic time series;

defining a negative polarity probability density function consistent with the positive polarity probability density function and a requirement that instantaneous positive and negative probability values sum to unity;

taking the respective products of the positive and negative polarity probability density functions with an onset probability density function defining a probability that the onset of the signal occurs at a given time sample;

marginalizing the respective products of the positive and negative polarity probability density functions with the onset probability density function over time to estimate final probabilities that the onset has a positive or a negative polarity; and using the estimated final probabilities as a constraint when performing source inversion on the noisy seismic time series and thereby determining the focal point source types of fractures or faults in a rock formation in response to earthquake events.

9. The method according to claim 8, wherein the probability density function, $(P+|_{meas})$, for a positive polarity (+), given a polarity function pol(t) that defines the polarity at time t, an amplitude change ($\Delta(t)$) between successive extrema, and an estimated noise standard deviation $\sigma_{meas}$ is a cumulative distribution of the product of polarities and amplitude changes.

10. The method according to claim 8, wherein the method is performed repeatedly for each of plural noisy seismic time series.

11. The method according to any claim 8, wherein the noisy seismic time series is a seismogram.

12. The method according to claim 11, wherein the seismogram is a waveform of a pressure wave, a shear wave, a horizontally polarized shear wave or a vertically polarized shear wave.

13. The method according to claim 11, comprising a preliminary step of performing seismic testing using one or more hydrophones, geophones, accelerometers, and/or distributed acoustic sensing to obtain the seismogram.

14. A method for performing a hydraulic fracturing operation in a well, the method comprising:

injecting fluid into the well to create cracks in downhole rock formations;

simultaneously obtaining microseismic data from the formations, the microseismic data including one or more seismograms;

performing the method of claim 11 on the one or more seismograms; and using the estimated final probabilities to determine the focal point source types of cracks created in response to the injection of the fluid.

* * * * *